US012618468B2

(12) United States Patent
Long et al.

(10) Patent No.: US 12,618,468 B2
(45) Date of Patent: May 5, 2026

(54) ELECTRIC CLUTCH FOR WORK VEHICLE POWER SHIFT TRANSMISSION

(71) Applicant: Deere & Company, Moline, IL (US)

(72) Inventors: Randall L. Long, Coffeyville, KS (US); Zachariah E. Albert, Independence, KS (US); Stacy K. Worley, Coffeyville, KS (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 18/926,978

(22) Filed: Oct. 25, 2024

(65) Prior Publication Data

US 2026/0117862 A1 Apr. 30, 2026

(51) Int. Cl.
F16H 63/30 (2006.01)

(52) U.S. Cl.
CPC ... F16H 63/304 (2013.01); *F16H 2063/3056* (2013.01)

(58) Field of Classification Search
CPC ........... F16H 63/304; F16H 2063/3056; F16D 2023/123
See application file for complete search history.

(56) References Cited

U.S. PATENT DOCUMENTS 6,662,919 B2    12/2003  Jung et al.
11,493,128 B2 *  11/2022  Kishida ................... F16H 63/04

FOREIGN PATENT DOCUMENTS

DE      102011076542 A1    7/2021
JP          5645414 B2    12/2014

OTHER PUBLICATIONS

Utility U.S. Appl. No. 18/343,003, filed Jun. 28, 2023 [52 pages].

* cited by examiner

*Primary Examiner* — Huan Le
(74) *Attorney, Agent, or Firm* — KLINTWORTH & ROZENBLAT LLP

(57) ABSTRACT

Disclosed is an electric clutch including a clutch pack having clutch members transmitting torque when engaged, an input mechanism, and an actuator assembly. The input mechanism including a pinion gear configured to receive rotational input from an electric machine and a cam gear meshing with the pinion gear to rotate about a reference axis. The actuator assembly including an actuator spring and a cam disc disposed about the reference axis and engaging the cam gear at a cam ramp such that changing a clock position of the cam gear about the reference axis imparts translation of the cam disc along the reference axis to move the actuator spring. The actuator assembly further includes an actuator piston moved by the actuator spring in response to the translation of the cam disc to engage the clutch members of the clutch pack.

18 Claims, 13 Drawing Sheets

ELECTRIC CLUTCH FOR WORK VEHICLE POWER SHIFT TRANSMISSION

STATEMENT OF FEDERALLY SPONSORED RESEARCH OR DEVELOPMENT

Not applicable.

FIELD OF THE DISCLOSURE

This disclosure generally relates to an electric clutch for a transmission system of a work vehicle.

BACKGROUND OF THE DISCLOSURE

Heavy-duty work vehicles, such as those used in the agricultural, construction, forestry, and mining industries, may be an electric vehicle using an electric machine to drive the work vehicle. The drive system of these heavy-duty work vehicles can benefit from power shifting where the clutch is slowly engaged and slightly slips before full engagement to allow shifting to occur smoothly. Pneumatic clutches run by hydraulics can perform the power shifting smoothly where two clutches carry torque for a portion of time between the shifting; however, these clutches require a hydraulic pump and hydraulic fluid to operate. Electric clutches work well when you can stop and shift or do a 100 percent synchronous shift, but electric clutches fall short when performing a power shift due to their design being more of an on/off clutch system.

SUMMARY OF THE DISCLOSURE

An electric clutch includes a clutch pack having clutch members transmitting torque when engaged, an input mechanism, and an actuator assembly. The input mechanism includes a pinion gear configured to receive rotational input from an electric machine and a cam gear meshing with the pinion gear to rotate about a reference axis. The actuator assembly includes an actuator spring, a cam disc, and actuator piston. The cam disc is disposed about the reference axis and engages the cam gear at a cam ramp such that changing a clock position of the cam gear about the reference axis imparts translation of the cam disc along the reference axis to move the actuator spring. The actuator piston is moved by the actuator spring in response to the translation of the cam disc to engage the clutch members of the clutch pack.

In an example of the electric clutch, the pinion gear drives the cam gear between a range of clock angles about the reference axis corresponding to a range of translational positions of the cam disc along the reference axis. In a further example of the electric clutch, in a first translational position of the cam disc, the actuator spring is sized and configured to position the actuator piston to engage the clutch members, and in a second translational position of the cam disc, the actuator spring is sized and configured such that it does not position the actuator piston to engage the clutch members.

In a further example of the electric clutch, the actuator spring is configured to bias the actuator piston toward the clutch pack. In a further example of the electric clutch, the cam disc defines the cam ramp and the cam gear has a cam follower that engages the cam ramp to effect translation of the cam disc along the reference axis. In a further example of the electric clutch, the cam disc has an annular peripheral flange extending about the reference axis and having a toothed periphery that fixes a clock position of the cam disc, and the cam ramp is a radially raised surface that tapers along the annular peripheral flange of the cam disc. In a further example of the electric clutch, the cam gear is a ring gear formed by an annular body extending about the reference axis and having an inner circumference and an outer circumference, and the outer circumference having a plurality of teeth that mesh with the pinion gear and the inner circumference having the cam follower. In a further example of the electric clutch, the cam disc defines clock limiters on opposite ends of the cam ramp that engage the cam follower to impede rotation about the reference axis.

In a further example of the electric clutch, the pinion gear is a worm gear and the cam gear is a ring gear having a toothed outer circumference that meshes with the worm gear to change the clock position of the ring gear about the reference axis. In a further example of the electric clutch, the actuator spring is disposed concentrically about the actuator piston, the cam disc is disposed concentrically about the actuator spring, and the cam gear is disposed concentrically about the cam disc.

In a further example of the electric clutch, the actuator assembly further includes a return spring sized and configured to provide a return spring force that biases the actuator piston away from the clutch pack, and wherein the actuator spring is sized and configured to provide an actuating spring force that overcomes the return spring force in at least one translational position of the cam disc to translate the actuator piston toward the clutch pack. In a further example of the electric clutch, the input mechanism includes the electric machine driving the pinion gear.

A transmission for a work vehicle includes an output shaft, a gear providing a gear ratio, and an electric clutch coupling the gear to the output shaft when engaged. The electric clutch includes a clutch pack having clutch members transmitting torque when engaged, an input mechanism, and an actuator assembly. The input mechanism includes a pinion gear configured to receive rotational input from an electric machine and a cam gear meshing with the pinion gear to rotate about a reference axis. The actuator assembly includes an actuator spring, a cam disc, and an actuator piston. The cam disc is disposed about the reference axis and engages the cam gear at a cam ramp such that changing a clock position of the cam gear about the reference axis imparts translation of the cam disc along the reference axis to move the actuator spring. The actuator piston is moved by the actuator spring in response to the translation of the cam disc to engage the clutch members of the clutch pack.

In an example of the transmission, the input mechanism includes the electric machine driving the pinion gear. In a further example of the transmission, the pinion gear drives the cam gear between a range of clock angles about the reference axis corresponding to a range of translational positions of the cam disc along the reference axis. In a further example of the transmission, a first translational position of the cam disc, the actuator spring is sized and configured to position the actuator piston to engage the clutch members, and in a second translational position of the cam disc, the actuator spring is sized and configured such that it does not position the actuator piston to engage the clutch members.

In a further example of the transmission, the cam disc defines the cam ramp and the cam gear has a cam follower that engages the cam ramp to effect translation of the cam disc along the reference axis. In a further example of the transmission, the cam gear is a ring gear formed by an annular body extending about the reference axis and having an inner circumference and an outer circumference, the outer circumference having a plurality of teeth that mesh with the pinion gear and the inner circumference having the cam follower. The cam disc has an annular peripheral flange extending about the reference axis and having a toothed periphery that fixes a clock position of the cam disc, the cam ramp is a radially raised surface that tapers along the annular peripheral flange of the cam disc, and the cam disc defines clock limiters on opposite ends of the cam ramp that engage the cam follower to impede rotation about the reference axis.

In a further example of the transmission, wherein the actuator spring is disposed concentrically about the actuator piston, the cam disc is disposed concentrically about the actuator spring, and the cam gear is disposed concentrically about the cam disc. In a further example of the transmission, the actuator assembly further includes a return spring sized and configured to provide a return spring force that biases the actuator piston away from the clutch pack, and the actuator spring is sized and configured to provide an actuating spring force that overcomes the return spring force in at least one translational position of the cam disc to translate the actuator piston toward the clutch pack.

Other features and aspects will become apparent by consideration of the detailed description, claims, and accompanying drawings.

Figure 1:
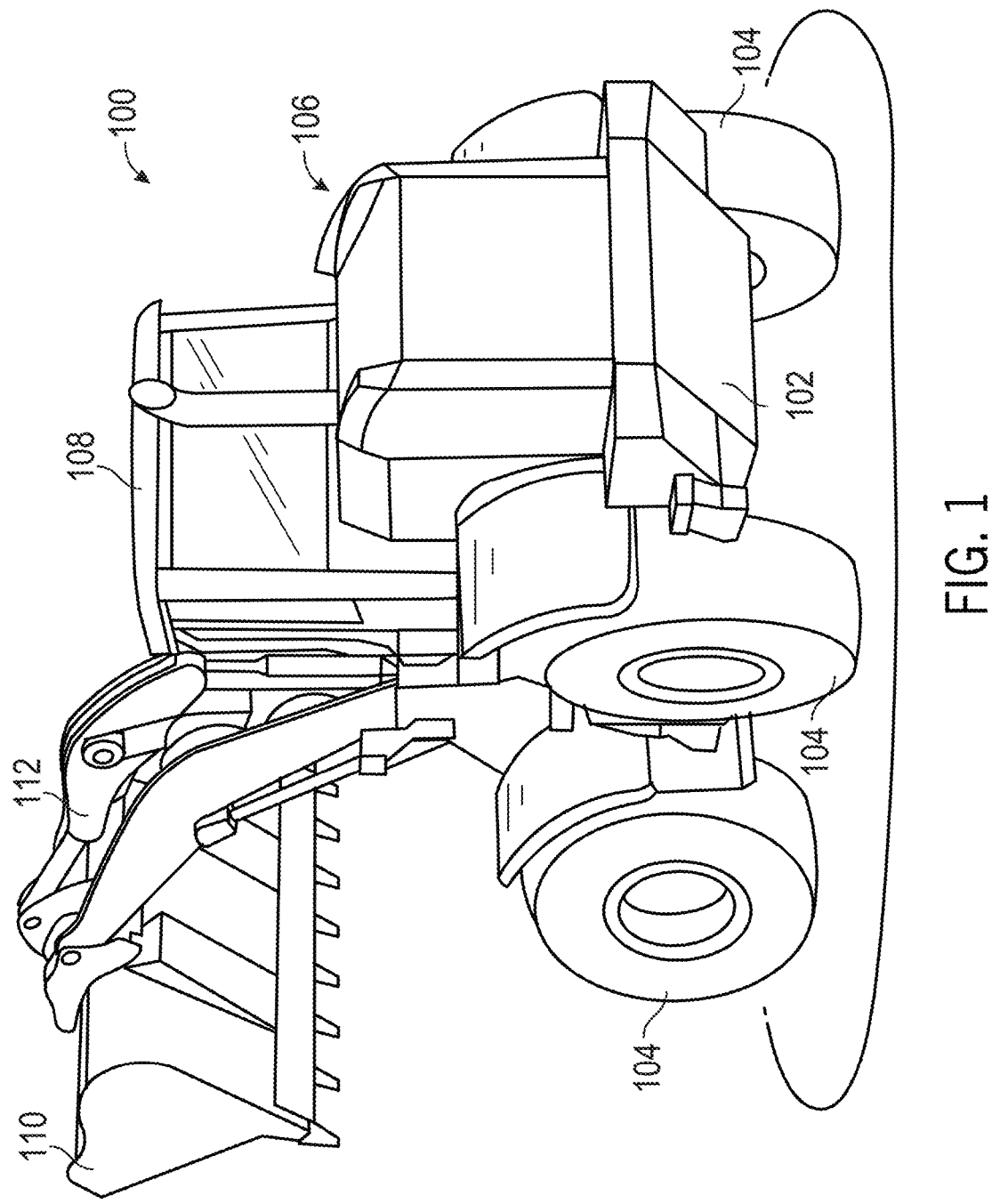
FIG. 1 is an example work vehicle, in the form of a wheel loader, having a drive assembly with an electric clutch according to the present disclosure.

Throughout the drawings, identical reference numbers designate the same element. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

The following disclosure describes one or more example embodiments of the disclosed electric clutch for a work vehicle as shown in the accompanying figures of the drawings described briefly above. Various modifications to the example embodiments may be contemplated by one of skill in the art. Discussion herein focuses on an electric clutch for a gearing system of a work vehicle, such as a wheeled loader, but the electric clutch disclosed herein may be utilized in other contexts, including other work vehicle platforms in the agriculture, construction, forestry, mining, and other industries.

OVERVIEW

Power shifting can be desired in the operation of heavy-duty work vehicles to allow a smooth transition from one gearing system to another without stopping the work vehicle. For the power shift to occur, a first clutch that is currently engaged needs to begin disengaging and be allowed to slip while a second clutch that is disengaged begins engaging and is allowed to slip. At that point some torque to move the work vehicle is being transmitted through both clutches intermittently or concurrently until one clutch is fully engaged and the other clutch is fully disengaged. This operation is conventionally performed by a hydraulic system.

The present disclosure provides an electric clutch assembly that can replicate the functionality of a hydraulic system and hydraulically-actuated clutch during power shifting. An electric clutch that can perform this operation is desirable to eliminate the need for hydraulic hardware (e.g., a hydraulic pump, hydraulic lines, and hydraulic fluid needed to operate a hydraulic clutch). The electric clutch assembly performs the operations of engaging while allowing the clutch to slip until the clutch is fully engaged and disengaging while allowing the clutch to slip until the clutch is fully disengaged. This electric clutch can be used to allow power shifting between two gearing systems. For example, an electric clutch assembly can be placed to engage/disengage one gearing system and another electric clutch assembly can be placed to engage/disengage another gearing system to allow power shifting between the gearing systems through operation of the electric clutches.

The electric clutch assembly may include a clutch pack, an input mechanism, and an actuator assembly. The input mechanism includes an electric machine coupled to a gearing system. The gearing system is driven by the electric machine and drives the actuator assembly to engage/disengaged the clutch pack.

The gearing system includes a pinion gear and a cam gear. The pinion gear receives rotational input from the electric machine and drives the cam gear. In at least one aspect, the pinion gear is a worm gear and the cam gear is a ring gear. The ring gear can have teeth along the outer circumference that mesh with the worm gear. The ring gear can include an annular concave section along the outer circumference that meshes with the worm gear. For example, the annular concave section can at least partially surround the worm gear. In an alternative aspect, a different gearing system can be used to drive the ring gear. For example, a different type of gear (e.g., spur gear, herringbone gear, sprocket, etc.) could drive the ring gear or even a belt could wrap around the ring gear to drive the ring gear. In the end, the electric machine is mechanically coupled to the ring gear to cause the ring gear to rotate. The rotation of the ring gear drives the actuator assembly to engage/disengaged the clutch pack.

The actuator assembly includes a cam disc, an actuator spring, and an actuator piston. The actuator spring is disposed concentrically about the actuator piston and the cam disc is disposed concentrically about the actuator spring. The actuator piston is positioned along a reference axis. Translation of the cam disc along the reference axis changes the compression of the actuator spring. The actuator spring applies a biasing force that causes the actuator piston to translate along the reference axis and engage/disengage the clutch pack. The actuator spring is one or more compression springs.

The ring gear is disposed concentrically about the cam disc. The ring gear can rotate about the reference axis and is otherwise fixed in position. For example, the ring gear can be held in position by thrust washers placed on either side of the ring gear, where the thrust washers are held in position by a housing of the work vehicle. The ring gear includes at least one cam follower positioned around the inner circumference of the ring gear. The one or more cam followers engage a cam ramp of the cam disc. The cam ramp is a radially raised surface that tapers along an outer circumferential surface of the cam disc. Rotation of the ring gear moves the cam followers along the cam ramp, which causes the cam disc to translate along the reference axis to compress/decompress the actuator spring to engage/disengage the clutch pack. The ring gear can be configured such that an amount of rotation can move the clutch pack from a fully disengaged position to a fully engaged position. For example, a rotation of 120 degrees of the ring gear can cause the cam disc to translate a predetermined distance along the reference axis. The translation of the cam disc can cause the actuator spring to compress a predetermined amount to apply a predetermined biasing force to the actuator piston. The predetermined biasing force is also applied to the cam disc but the cam disc is engaged with the cam followers of the ring gear that will keep the cam disc from translating due to the predetermined biasing force. The predetermined biasing force causes the actuator piston to translate along the references axis another predetermined distance to compress the clutch pack from the fully disengaged position to the fully engaged position.

In at least one aspect, cam ramps can be disposed around the cam disc and each cam ramp can engage a cam follower of the ring gear. In at least one aspect, there are three cam ramps and three cam followers. In an alternative aspect, there could be any number of cam ramps greater than zero. The cam ramp can be designed such that movement of the cam follow along the entire length of the cam ramp can move the clutch pack from the engaged/disengaged position to the disengaged/engaged position. The amount of rotation of the ring gear to move the cam follow the entire length of the cam ramp can relate to the number of cam ramps. For example, there could be three cam ramps spread around the entire outer circumference of the cam disc. As such, the rotation would be approximately 120 degrees to move a cam follower the entire length of the cam ramp. For example, the maximum amount of rotation is 360 divided by the number of cam ramps. If there are spaces between the cam ramps, then the amount of rotation needed by ring gear would be less than 360 divided by the number of cam ramps. The design of the cam ramps and spacing between them determines the amount of rotation to move the cam follower the entire length of the cam ramp.

The actuator piston is disposed concentrically on a clutch hub. The clutch hub can be disposed on a drive shaft and meshed with the drive shaft such that rotation of the drive shaft rotates the clutch hub. A gear that the clutch assembly is to engage/disengage can be positioned concentrically about the clutch hub with the clutch pack disposed between the clutch hub and the gear. The clutch pack can have first members that engage an outer circumferential surface of the clutch hub and second members that engage an inner circumferential surface of the gear. The first and second members can be dispersed every other through the clutch pack so that each first member rests against at least one second member. Compressing the clutch pack begins to engage the clutch pack and presses the first members against the second members to generate a frictional force between the first members and second members. As the friction force builds, torque begins to be transmitted from either the gear to the drive shaft or the drive shaft to the gear. The first members and second members can slip past each other in the beginning of the compression and once the clutch pack is compressed enough, then the clutch pack is fully engaged and the first and second clutch members rotate together. When the clutch pack is fully engaged, the full torque is being provided between the drive shaft and gear. Disengaging the clutch pack is similar but the reverse in that the clutch pack is fully engaged, begins to disengage allowing slipping between the first and second members until the clutch pack is fully disengaged.

To help the actuator piston move away and fully disengage from the clutch pack a return spring is positioned concentrically about the clutch hub to apply a biasing force on the actuator piston to translate the actuator piston away from the clutch pack. The return spring is one or more compression springs. The biasing force of the actuator spring must overcome the biasing force of the return spring to translate the actuator piston to engage the clutch pack.

The speed the clutch pack needs to become engaged and disengaged can be based on the type of work vehicle and the operations desired to be performed by the work vehicle. The speed of the compression of the clutch pack is a function of the translational movement of the actuator piston. The translational movement of the actuator piston is based on the amount of biasing force produced by the actuator spring. The speed at which the clutch pack is engaged can be changed by changing the speed the electric machine rotates the pinion gear, changing the slope of the cam ramp, and/or changing the actuator spring to have a different spring constant which affects the biasing force produced over a distance. The speed of the pinion gear rotates changes how fast the cam gear rotates, which affects the speed of the translational movement of the cam disc. The slope of the cam ramp changes how fast the cam disc translates based on a rotation of the cam gear. Changing the actuator spring to have a higher spring constant has the actuator spring produce a larger biasing force from less movement and can cause the actuator piston to translate more with less translational movement of the cam disc.

One or more example embodiments of an electric clutch of a work vehicle are provided in the figures of the present disclosure. The following description should be understood as merely providing a non-limiting example context in which embodiments of the present disclosure may be better understood.

Example Electric Clutch for a Work Vehicle

Figure 2:
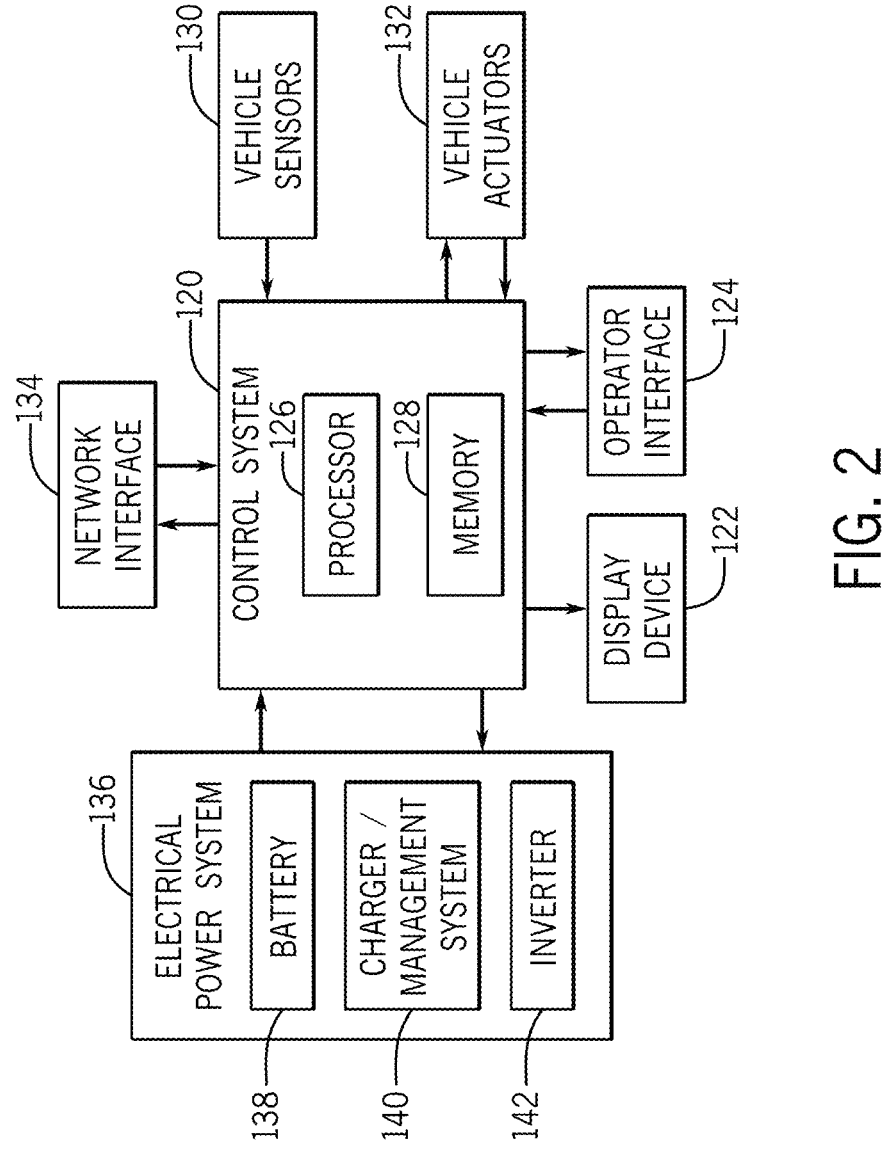
FIG. 2 is a schematic diagram of an example control system of the work vehicle of FIG. 1.

Referring to FIGS. 1 and 2, a work vehicle 100 is implemented as a wheel loader or any other heavy-duty work vehicle such as those used in the agricultural, construction, forestry and mining industries. The work vehicle 100 includes a chassis 102 mounting a plurality of ground-engaging members 104, such as wheels or tracks, supporting the chassis 102 off the ground. Supported on the chassis 22 is an engine bay housing 106 and an operator cabin 108 to be occupied by an operator of the work vehicle 100. It should be understood that the present disclosure may also pertain to autonomous work vehicles, in which case the operator cabin may be omitted. The work vehicle further includes a front bucket 110 mechanically linked to a forward portion of the chassis 102 by a boom assembly 112.

The operator cabin 108 may include one or more display devices 122 and any of various operator interfaces 124 coupled to a control system 120. Apart from the display devices 122, the operator interface devices 124 may include various video and audio devices for providing video and audio information, haptic devices that provide haptic feedback, levers, joysticks, steering wheels, pedals, buttons, and so on. Operator interface devices 124 can also be a set of inputs displayed on the display devices 122, for example, links, icons, or other user actuatable mechanisms. Additionally, or alternatively, some portion of the operator interfaces 124 may be integrated into the display devices 122, such that the operator interfaces 124 may include physical inputs (e.g. buttons, switches, dials, etc.) on or near the display devices 122, a touchscreen module integrated into the display devices 122, or a cursor input device (e.g., a joystick, trackball, or mouse) for positioning a cursor utilized to interface with GUI elements generated on the display devices 122. The display devices 122 can be any image-generating device configured for operation within the operator cabin 108, including one or more dedicated display consoles and various heads-up display projectors.

The display devices 122 and operator interfaces 124 are operatively coupled to the control system 120 with various data connections between these components represented by a number of signal lines generally representative of wired and/or wireless data connections. The control system 120 has one or more controllers or other control architecture that can assume any form suitable for performing the functions described herein, and is used in a non-limiting sense to generally refer to the processing architecture or system of the work vehicle 100 or other computing device or group of devices. For example, the control system 120 can encompass or may be corresponding to any practical number of processors, control computers, computer-readable memories, power supplies, storage devices, interface cards, and other standardized components, and may also include or cooperate with any number of firmware and software programs or computer-readable instructions designed to carry-out the various process tasks, calculations, and control/display functions described herein, all represented by a processor 126. Such computer-readable instructions may be stored within a non-volatile sector of a local onboard memory 128, which is accessible to the control system 120. While generically illustrated as a single block, the memory 128 can encompass any number and type of storage media suitable for storing computer-readable code or instructions, as well as other data utilized to support the operation of the work vehicle 100. The memory 128 may be integrated into the controller architecture in various embodiments such as, for example, a system-in-package, a system-on-a-chip, or another type of microelectronic package or module.

The work vehicle 100 may include various onboard sensors and actuators referred to herein collectively by reference numbers 130 and 132, respectively, and a network interface 134. For example, the work vehicle 100 can include a ground speed sensor that senses the travel speed of work vehicle 100 over a field, for example, by sensing the speed of rotation of the ground-engaging members 104, a drive shaft, the axle, or other components. The travel speed can also be sensed by a positioning system, such as a global positioning system (GPS), a dead reckoning system, a LORAN system, or a wide variety of other systems or sensors that provide an indication of travel speed and heading. The onboard sensors 130 can include various different types of sensor architectures for providing the control system 120 with input pertaining to the operational parameters of the work vehicle 100, data pertaining to the surrounding environment of the work vehicle 100, and other such information useful to operation of the work vehicle 100. The onboard sensors 130 may include some form of receiver, chip set, or the like for determining position utilizing a satellite navigation system including, but not limited to, GPS, Galileo, Global Navigation Satellite System (GNSS or GLONASS), Compass-IGS01, and combinations of the satellites included therein. The onboard sensors 130 can also include various linear and angular position sensors, inertial sensors (e.g., micro-electro-mechanical system inertial measurement units "MEMS IMU" devices), strain sensors, pressure sensors, motor speed sensors, temperature sensors, moisture sensors, wear sensors, vibration sensors, image sensors or cameras, and/or sensors for measuring radio frequency (RF) signals.

Various ones or combinations or the foregoing (or other) sensors will be capable of sensing the travel speed, heading, and spatial orientation (e.g., pitch, roll, and yaw) of the work vehicle 100. Moreover, various ones or combinations or the foregoing (or other) sensors will be capable of sensing the load characteristics (e.g., mass, center of mass, height, etc.) of the work vehicle 100, including loading at work implements attached to or carried onboard the work vehicle 100 (e.g., loader, backhoe, etc.) and work implements towed behind or driven at the front of the work vehicle 100 (e.g., tillage equipment, baler, plow, etc.)

Similarly, the actuators 132 onboard the work vehicle 100 may assume different forms for performing functions supporting its operation. For example, the actuators 132 may serve to provide tractive force to the ground-engaging members 104, operate pneumatic and hydraulic systems if being used, and impart linear or angular motion to work implements attached to the work vehicle 100. The actuators 132 may take any of various forms, including various motors, pumps, linear actuators (e.g., cylinders), solenoids and other valves, clutches, brakes, and any other mechanism that may transmit power from one component to another. The actuators 132 may include mechanical, electrical, and/or hydraulic aspects and thus may be coupled to and receive power from the electrical power system 136.

It should be understood that that the aforementioned onboard sensors 130 and actuators 132 may include any number of sensors and actuators located to sense parameters of various attachments that are propelled by the work vehicle 100. Such attachments may include towed implements attached to the rear of the work vehicle 100 (e.g., various tillage equipment, balers, sprayers, windrowers, backhoes, etc.) as well as implements that attached to the front end of the work vehicle 100 (e.g., various loaders, plows, brushes, etc.). These attachments may receive various forms of power (e.g., electric and hydraulic) so as to be a part of the electrical power system 136, or they may have separate self-contained power systems or be otherwise unpowered.

The network interface 134 can be any device or module providing access to a network, such as a wireless (e.g., WiFi or cellular) transceiver or datalink, including an antenna. The network interface 48 can also include a satellite receiver and may receive data via a satellite link and may allow communication with nearby cellular towers or terrestrial nodes, such as wireless RF nodes included in a controller area network ("CAN") established over an agricultural area (e.g., a field or group of fields) within which the work vehicle 100 operates. Suitable equipment for usage as the network interface 134 includes the line of telematics receivers and transmitters commercially offered by Deere & Company, currently headquartered in Moline, Ill., and marketed under the brand name "JDLink™". Such examples notwithstanding, the particular form assumed by the network interface 48 may vary, providing that network interface 134 provides persistent or intermittent wireless conductivity to the network.

The electrical power system 136 may include one or more battery packs 138 that may include battery cells as well as associated circuitry for delivering power to and from the battery cells of various technologies (e.g., lead acid, lithium, lithium ion, lithium sulfur, lithium iron phosphate, lithium cobalt, nickel metal hydride, nickel cadmium, ultracapacitors, etc.). The battery packs 138 may include temperature sensors and conduits for conducting coolant through the battery packs 138. The electrical power system 136 may include a battery management system ("BMS") 140, which may, for example, manage its charging, detect low-charge conditions, and predict remaining run-time. The BMS 140 may also provide information about the current, voltage, and temperature of the battery packs 138. The BMS 140 may also employ chargers, added to or embedded in the battery packs 138, to charge the battery packs 138 to optimal levels and temperatures. The BMS 140 may include or utilize a general purpose input/output ("GPIO") interface to communicate with battery pack 138. The electrical power system 28 may include one or more inverters 142 to convert direct current ("DC") into alternating current ("AC"). The inverters 142 may take any suitable form, such as an insulated-gate bipolar transistor ("IGBT") inverter and a silicon carbide ("SiC") inverter. The inverters 142 may receive DC current from the battery packs 138 through the GPIO interface and DC bus for receiving DC current from the battery packs 138. The inverters 142 may also receive power from other sources (e.g., an onboard generator or regenerative braking) which may be converted to DC current by the inverter 142 and supplied to the battery packs 138 via the GPIO interface and DC bus.

Figure 3:
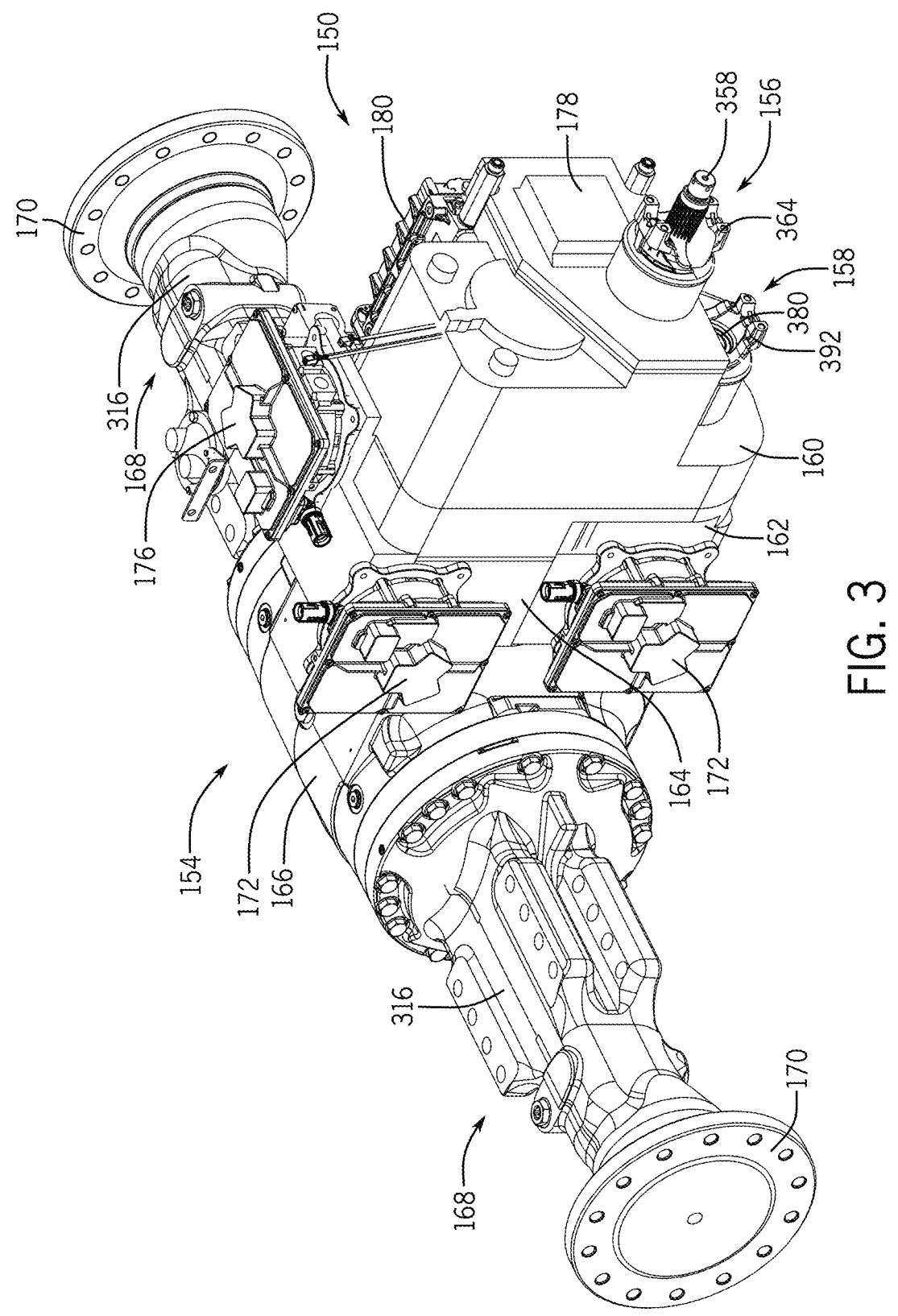
FIG. 3 is a perspective view of an example drive assembly of the work vehicle of FIG. 1.

FIGS. 3-11 illustrate an example drive assembly 150 including an electric machine 152 (e.g., actuator 132) that can be positioned within the engine bay housing and a transmission system 154 to couple the electric machine 152 to the ground engaging members 104. Referring also to FIG. 3, the drive assembly 150 includes a motor and inverter housing 160, a forward housing 162, a middle housing 164 and a differential housing 166, where each enclose various components of the drive assembly 150. The motor and inverter housing 160 is attached to the forward housing 162, the forward housing 162 is attached to the middle housing 164, and the middle housing 164 is attached to the differential housing 166. In another aspect, there could be more or less housings to enclose the components of the drive assembly 150. The motor and inverter housing 160 encloses the electric machine 152 and has an inverter 180 (e.g., inverter 142) attached to the housing 160. An end plate 178 is attached to the end of the motor and inverter housing 160.

The electric machine 152 drives the transmission system 154 to drive the ground engaging members 104 of the work vehicle 100. The rear ground engaging members 104 can be attached to the wheel end units 168, such as by securing bolts through matching bolt hole patterns on rotatable hubs 170 of the wheel end units 168 and the mating hubs of the ground-engaging member 104. The wheel end units 168, in the depicted example, are essentially identical (i.e., symmetric left and right versions of the same) and configured to attach a rear left and rear right ground engaging member 104. The wheel end units 168 are attached to the differential housing 166.

Figure 4:
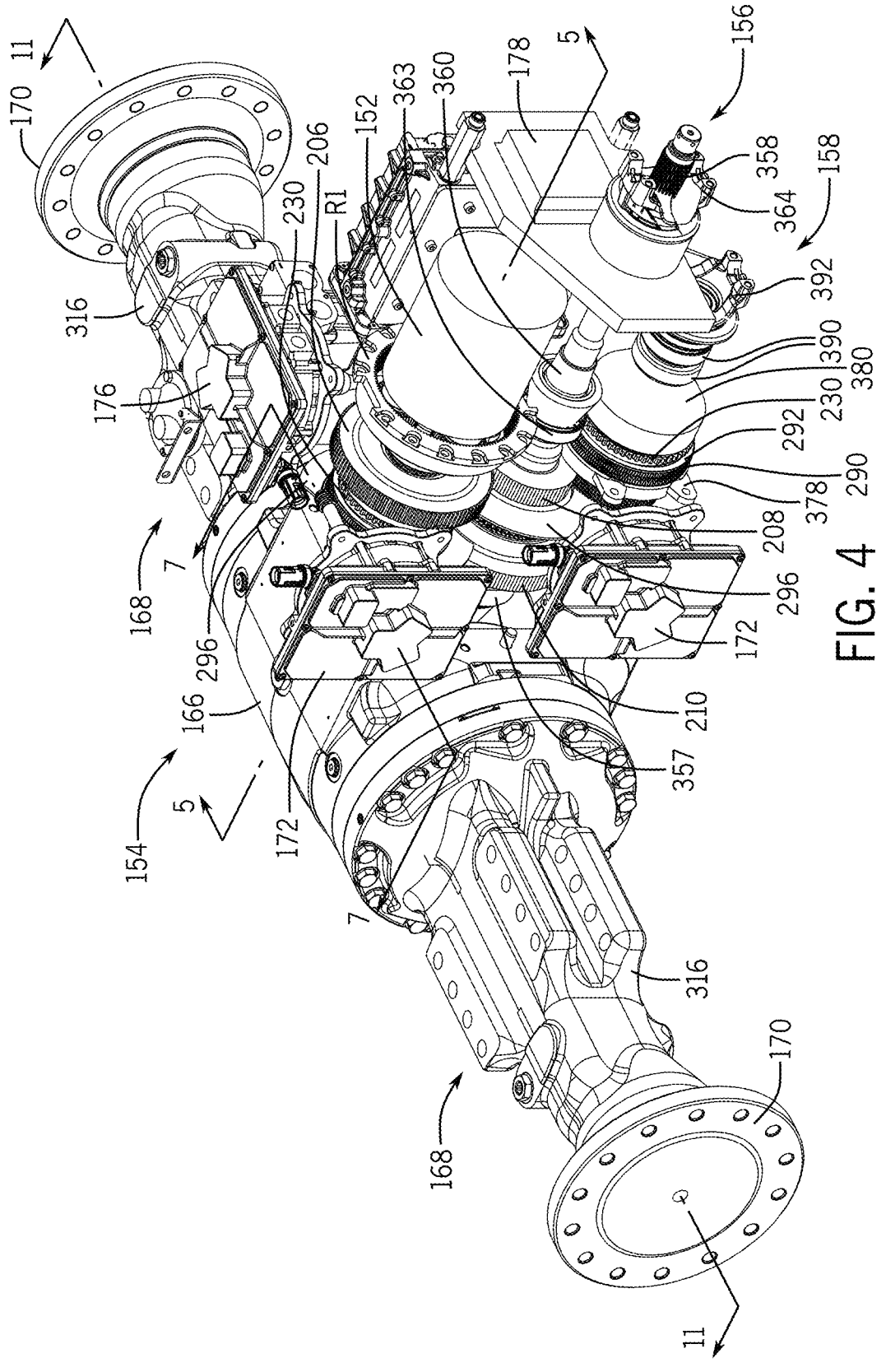
FIG. 4 is another perspective view thereof with one or more housings removed.
Figure 4A:
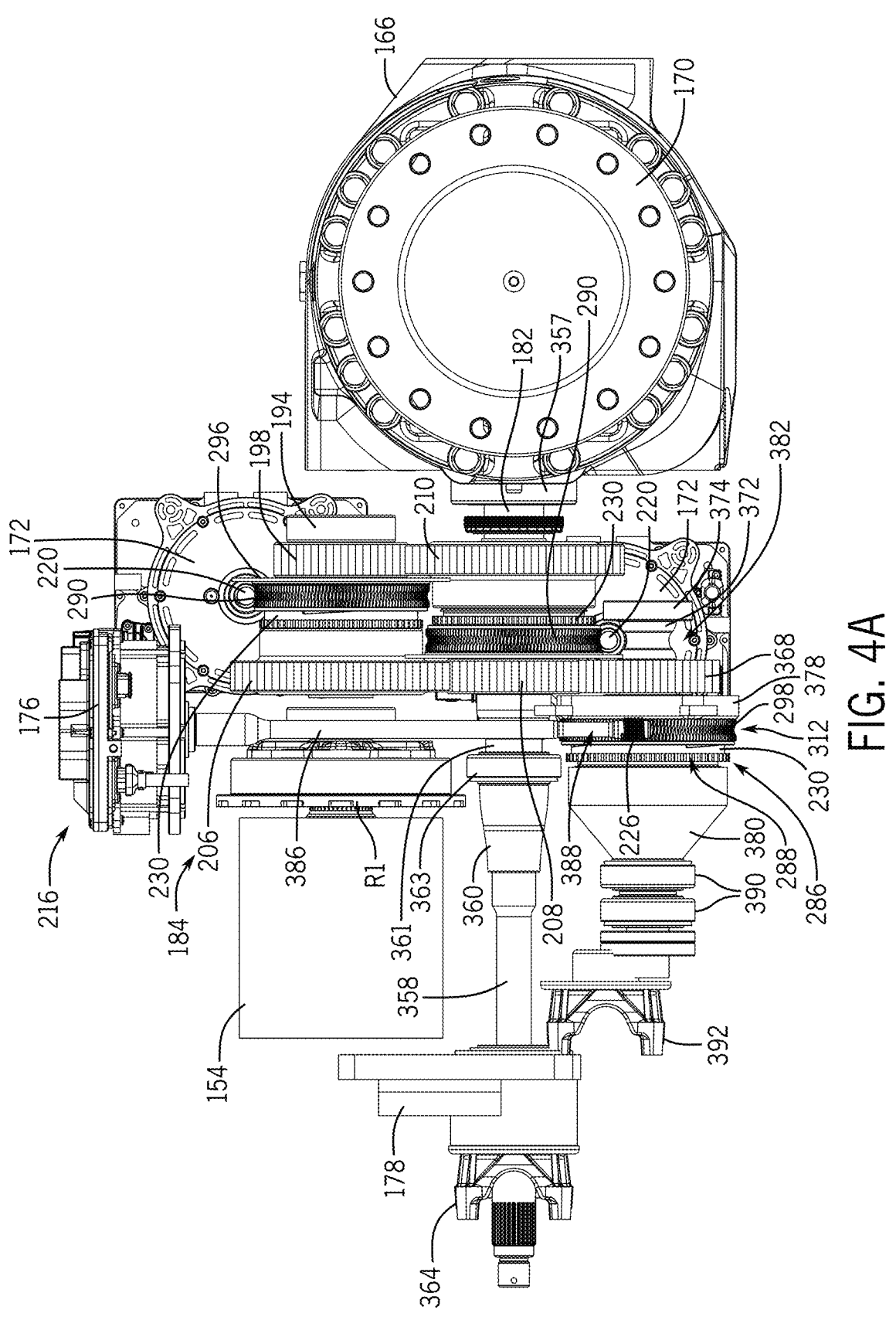
FIG. 4A is a side view thereof.
Figure 5:
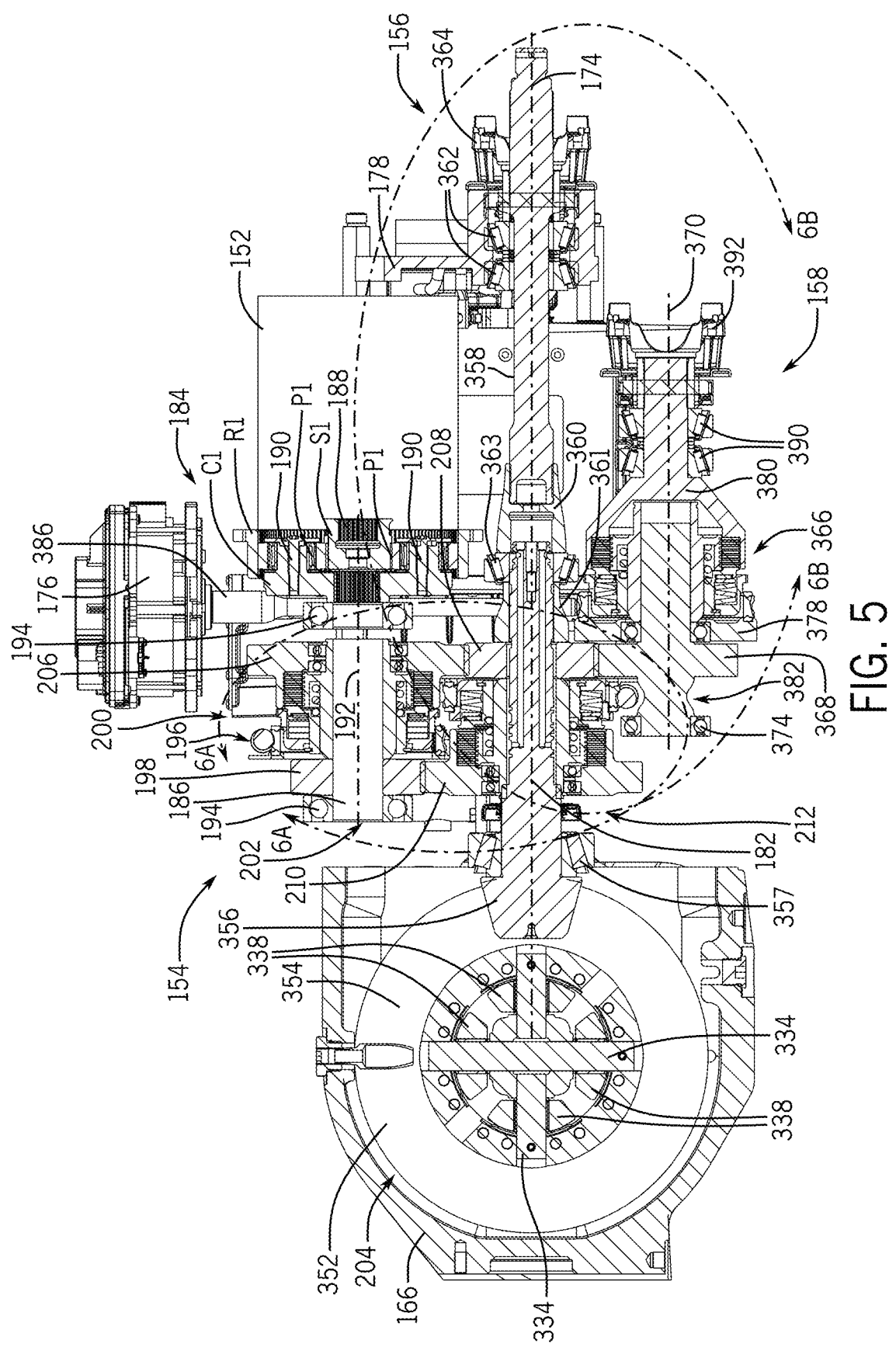
FIG. 5 is a cross-sectional view taken along line 5-5 of FIG. 4.

Referring also to FIGS. 4 and 5, the electric machine 152 drives a planetary gear set 184 that drives a drive shaft 186. The planetary gear set 184 includes a sun gear S1, planet gears P1, a ring gear R1, and a carrier C1. The ring gear R1 is stationary and is attached to the forward housing 162, where the forward housing maintains the ring gear R1 is a stationary position. The electric machine 152 includes an output shaft 188 extending from the electric machine 152. The output shaft 188 is coupled to drive the sun gear S1 such that the rotation of the output shaft 188 drives the sun gear S1 about reference axis 192. For example, the output shaft 188 can include teeth that are meshed with teeth of the sun gear S1. The sun gear S1 is coupled to the planet gears P1, where teeth of the sun gear are meshed with teeth of the planet gears P1. As such, rotation of the sun gear S1 causes the planet gears P1 to rotate around the sun gear S1 and the reference axis 192. The teeth of the planet gears P1 are meshed with teeth of the ring gear R1 such that the planet gears P1 react against the stationary ring gear R1 to rotate around the sun gear S1. The planet gears P1 are attached to a carrier C1 by pins 190, where the planet gears P1 can rotate relative to the carrier C1. The movement of the planet gears P1 around the reference axis 192 causes the carrier C1 to rotate about the reference axis 192. The carrier C1 is meshed with drive shaft 186 such that rotation of the carrier C1 rotates the drive shaft 186. In at least one aspect, the planetary gear set 184 is used to reduce the rotation per minute (RPM) and increase the torque from the electric machine 152. As such, the RPM is lower, and torque is higher at the drive shaft 186 than at the output shaft 188.

The drive shaft 186 extends away from the carrier C1 and passes through two bearings 194 toward opposite ends of the drive shaft 186. The bearing 194 allows the drive shaft 186 to freely rotate while supporting and holding the drive shaft 186 in position. The bearings 194 can be held in position by the middle housing 164. Rotation of the drive shaft 186 rotates the drive shaft 182 through engagement of a low-speed gearing assembly 202 or engagement of a high-speed gearing assembly 200. The rotation of the drive shaft 182 drives the differential assembly 204 to drive the wheel hubs 170 and the ground engaging members 104.

Figure 6A:
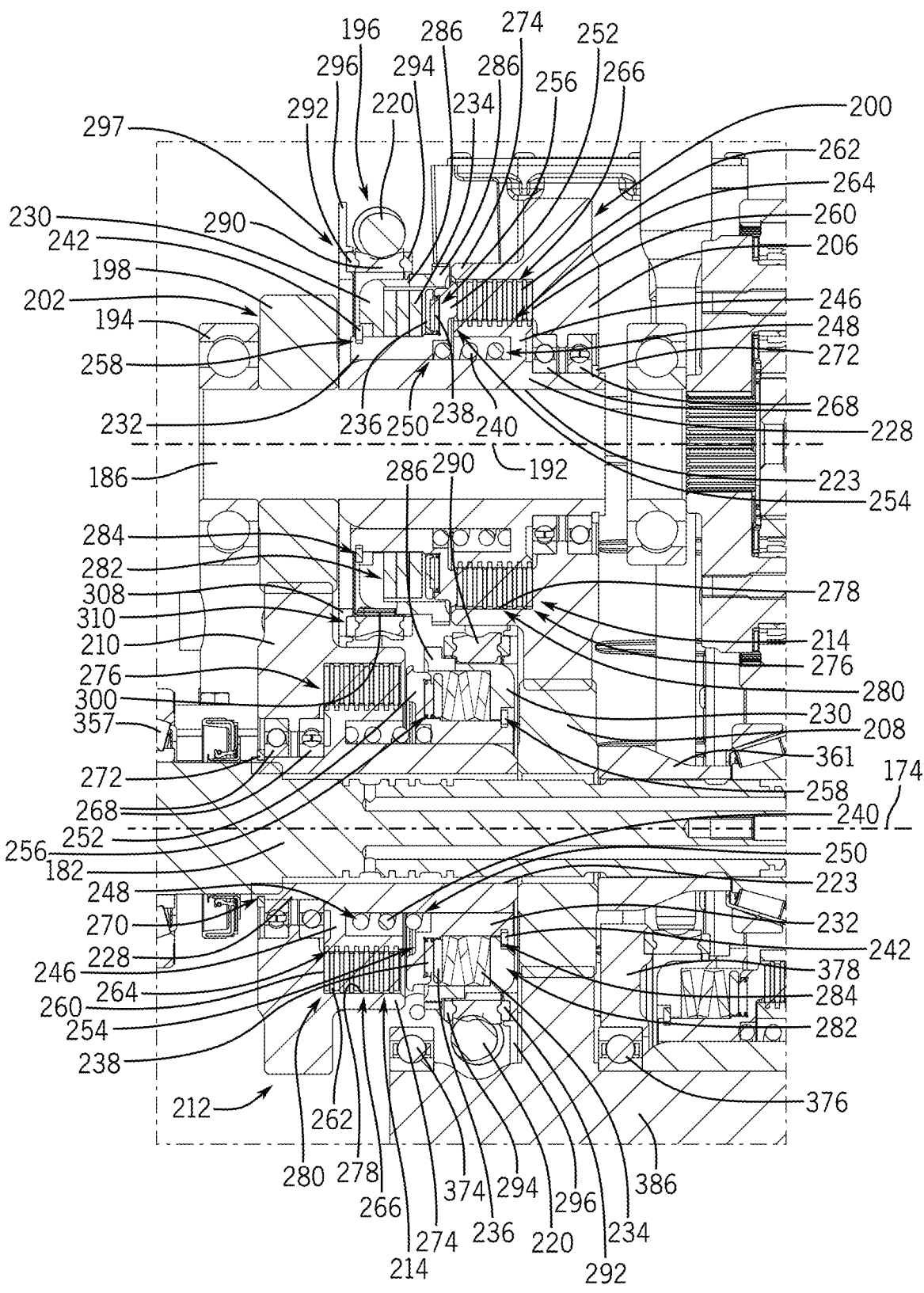
FIG. 6A is an enlarged detailed view showing area 6A-6A of FIG. 5.

Referring also to FIG. 6A, the low-speed gearing assembly 202 includes a first gear 206, a second gear 208, and an electric clutch assembly 196. The high-speed gearing assembly 200 includes a first gear 198, a second gear 210, and an electric clutch assembly 212. In at least one aspect, the electric clutch assembly 196 is the same as the electric clutch assembly 212. The drive shaft 186 extends through the electric clutch assembly 196, the first gear 206, and the first gear 198. The first gear 198 is mechanically coupled to the drive shaft 186 such that rotation of the drive shaft 186 rotates the first gear 198. For example, splines on the drive shaft 186 can mesh with splines of the first gear 198 to mechanically couple the first gear 198 to the drive shaft 186. The drive shaft 186 is mechanically coupled to the first gear 206 through the electric clutch assembly 196. As such, the first gear 206 rotates with the drive shaft 186 when the electric clutch assembly 196 is engaged and the first gear 206 does not rotate with the drive shaft 186 when the electric clutch assembly 196 is disengaged.

The drive shaft 182 extends through the electric clutch assembly 212, the second gear 210, and the second gear 208. The second gear 208 is mechanically coupled to the drive shaft 182 such that rotation of the drive shaft 182 rotates the second gear 208. For example, splines on the drive shaft 182 can mesh with splines of the second gear 208 to mechanically couple the second gear 208 to the drive shaft 182. The drive shaft 182 is mechanically coupled to the second gear 210 through the electric clutch assembly 212. As such, the second gear 210 rotates with the drive shaft when the electric clutch assembly 212 is engaged and the second gear 210 does not rotate with the drive shaft 182 when the electric clutch assembly 212 is disengaged.

The first gear 198 is mechanically coupled with the second gear 210, for example, gear teeth of the first gear 198 are meshed with gear teeth of the second gear 210. As such, rotation of the first gear 198 causes the second gear 210 to rotate and vice versa. The first gear 206 is mechanically coupled with the second gear 208, for example, gear teeth of the first gear 206 are meshed with gear teeth of the second gear 208. As such, rotation of the first gear 206 causes the second gear 208 to rotate and vice versa. For the low-speed gearing assembly 202, the first gear 198 is smaller than second gear 210. As such, when the electric clutch assembly 212 is engaged and electric clutch assembly 196 is disengaged, the drive shaft 182 rotates slower than drive shaft 186. For the high-speed gearing assembly 200, the first gear 206 is larger than second gear 208. As such, when the electric clutch assembly 212 is disengaged and electric clutch assembly 196 is engaged, the drive shaft 182 rotates faster than drive shaft 186. Engaging the high-speed gearing assembly 200 causes the drive shaft to rotate faster than engaging the low-speed gearing assembly 202.

In at least one aspect, the first gear 198 and second gear 208 are the same; and the first gear 206 and the second gear 210 are the same. In this aspect, engaging the electric clutch assembly 196 can cause the speed of the drive shaft 182 to step up by a specific gear ratio; and engaging the electric clutch assembly 212 can cause the speed of the drive shaft 182 to step down by the same specific gear ratio. The desired increase or decrease in the gear ratio can be determined by the size of the first gears 206, 198 and second gears 208, 210, respectively. In an alternative aspect, the first gear 198 and the second gear 208 are different; and the first gear 206 and the second gear 210 are different. As such, there does not need to be the same step up and step down in the gear ratios between the high-speed gearing assembly 200 and the low-speed gearing assembly 202.

When the electric clutch assembly 212 is engaged and electric clutch assembly 196 is disengaged, the first gear 206 will rotate based on the rotate of the second gear 208 caused by the rotation of the drive shaft 182. This rotation of the second gear 208 will not affect the rotation of the drive shaft 182 or drive shaft 186. When the electric clutch assembly 212 is disengaged and electric clutch assembly 196 is engaged, the second gear 210 will rotate based on the rotate of the first gear 198 caused by the rotation of the drive shaft 186. This rotation of the second gear 210 will not affect the rotation of the drive shaft 182 or drive shaft 186.

During power shifting from the high-speed gearing to the low-speed gearing, the electric clutch assembly 196 will be disengaging while the electric clutch assembly 212 is engaging. To perform a smooth transition, the electric clutch assemblies 196, 212 will both be slightly engaged for a brief amount of time where the electric clutch assemblies 196, 212 will slip to maintain a smooth rotation speed of the drive shaft 182. While the two electric clutch assemblies 196, 212 are slightly engaged, the rotation and torque of the drive shaft 182 is being supplied by both the high-speed gearing and the low-speed gearing, while each gearing is slipping to some degree. Slipping is required to allow the smooth transition between the gearing systems without requiring stopping or 100 percent synchronous shifting. Smooth rotation of the drive shaft during the power shifting relates to a smooth speed and movement of the work vehicle. Similarly, slipping of the two electric clutch assemblies 196, 212 also occurs during power shifting from the low-speed gearing assembly to the high-speed gearing.

The clutch assembly 196 will be described in detail and the description also applies to clutch assembly 212. Referring also to FIGS. 7-10, the clutch assembly 196 includes a clutch pack 214, an input mechanism 216, and an actuator assembly 218. The clutch pack 214 is positioned against first gear 206. The actuator assembly 218 is mechanically coupled to the first gear 206. The input mechanism 216 is used to cause the actuator assembly 218 to engage or disengage the clutch pack 214. When the clutch assembly 196 is engaged, the first gear 206 rotates with the clutch assembly 196, and when the clutch assembly is disengaged, the first gear 206 is no longer coupled to rotate with the clutch assembly 196. In an alternative aspect, the first gear 206 can be any component that needs to be engaged and disengaged from a driving component (e.g., gear, pulley, shaft, etc.).

The clutch pack 214 includes a plurality of first members 260 and a plurality of second members 262. The clutch pack 214 is formed by alternating the placement of the first members 260 and second members 262 such that the first members 260 are placed adjacent to second members 262 and the second members 262 are placed adjacent to first members 260. In at least one aspect, the surfaces of the second members 262 facing the first members 260 and the surfaces of the first members 260 facing the second members 262 are all rough surfaces. A friction force is formed between the first members 260 and second members 262 when a compression force is applied to the clutch pack 214. The compression force biases the first members 260 and second members 262 toward each other. The compression force has a direct relationship with the friction force between the first members 260 and the second members 262, whereas the compression force increases the friction force increases and as the compression force decreases the friction force decreases.

Increasing the compression force engages the clutch pack 214. As the compression force increases, the friction force will increase to be greater than a first threshold and the clutch pack 214 begins to engage transmitting torque through the clutch pack 214. When the clutch pack 214 begins to engage the first members 260 and the second members 262 can slip against one another. Slipping allows only a portion of the total torque to be transmitted through the clutch pack 214. As the compression force continues to increase the friction force will eventually be greater than a second threshold value, where the clutch pack 214 is fully engaged. When the clutch pack 214 is fully engaged, the first members 260 and the second members 262 will no longer slip against each other and rotate together. Additionally, in the fully engaged position, the clutch pack 214 will transfer the full torque through the clutch pack 214. In at least one aspect, the threshold value can change based on the terrain (e.g., moving uphill, moving downhill, moving over rough terrain, moving through muddy terrain, etc.) and operation of the work vehicle (e.g., overall weight of the work vehicle, speed the work vehicle is moving, etc.) and forces being applied to the ground engaging members. As the compression force is decreased, the friction force will decrease to below the second threshold, where the clutch pack 214 can slip, and then below the first threshold where the clutch pack 214 is disengaged. When the clutch pack 214 is disengaged, the first members 260 and the second member 262 can rotate differently about the reference axis 192 and no torque is transmitted through the clutch pack 214.

The first members 260 and the second members 262 are discs. The first members 260 include inner teeth 264 on the inner circumference of the first members 260. The second members 262 include outer teeth 266 on the outer circumference of the second members 262. The clutch pack 214 can be positioned outside of a first component and inside of a second component. The inner teeth 264 can mate with the first component and the outer teeth 266 can mate with the second component. When the clutch pack 214 is engaged the first component and the second component would be linked through the clutch pack 214 transmitting torque from the first or second component to the other component. Additionally, when the clutch pack 214 is fully engaged, the first component and the second component rotate together. When the clutch pack 214 is disengaged, the first component and the second component are no longer linked and can rotate differently relative to each other without transmitting torque through the clutch pack 214.

The actuator assembly 218 includes a clutch hub 228, a cam disc 230, an actuator piston 232, an actuator spring 234, a thrust washer 236, a thrust bearing 238, a return spring 240, and a first snap ring 242. The actuator assembly 218 is positioned on drive shaft 186 with the drive shaft 186 passing through each component. Each component 218, 228, 230, 232, 234, 236, 238, 240, 242 of the actuator assembly 218 is axially aligned with the reference axis 192. For clutch assembly 212, the actuator assembly 218 is positioned on drive shaft 182. The drive shaft 186 extends through an internal surface 223 of the clutch hub 228 and the clutch hub 228 is mechanically coupled to the drive shaft 186. For example, the internal surface 223 can include splines that mate with splines on the drive shaft 186. The clutch hub 228 rotates with the drive shaft 186.

The clutch hub 228 includes a protrusion 246 that defines a channel 248. The actuator piston 232 is positioned on the clutch hub 228 toward the opening of the channel 248. The first gear 206 is positioned on the clutch hub 228 opposite the actuator piston 232. The two bearings 268 are positioned between the first gear 206 and the clutch hub 228. The first gear 206 extends between the two bearings 268. The clutch hub 228 defines a channel 270 on the end with the first gear 206. A second snap ring 272 is positioned within the channel 270. The snap ring keeps the bearings 268 in position, which in turn keeps the first gear 206 in position on the clutch hub 228. The bearings 268 allow the first gear 206 to rotate relative to the clutch hub 228.

The first gear 206 includes a protrusion 274 extending along the reference axis 192. The protrusion 274 extends away from the bearings 268. The protrusion 274 defines a hole 276. The first gear 206 is positioned so that the protrusion 246 is placed within the hole 276. The clutch pack 214 is positioned between the inner surface 278 of the hole 276 and the outer surface of the protrusion 246. The inner surface 278 includes splines 280 that mate with the outer teeth 266 of the second members 262. The outer surface of the protrusion 246 includes splines 257 that mate with the inner teeth 264 of the first members 260 of the clutch pack 214. When the clutch pack 214 is engaged, the clutch pack 214 is compressed and the first gear 206 rotates with the clutch hub 228. When the clutch pack 214 is disengaged, the first gear 206 is free to rotate differently than the clutch hub 228.

The actuator piston 232 can translate along the reference axis 192 along the clutch hub 228. The actuator piston 232 defines a channel 250 that aligns with channel 248 of the clutch hub 228 to form a single channel extending into the actuator piston 232 and the clutch hub 228. The return spring 240 is positioned within the single channel and applies a force to bias the actuator piston 232 away from the protrusion 246 and clutch pack 214. The actuator piston 232 can slide along the clutch hub 228. The actuator piston 232 includes a protrusion 252 positioned on the end defining the channel 250. The protrusion 252 extends radially away from the reference axis 192. The protrusion 252 defines a cutout 254 positioned toward the protrusion 246. The protrusion 252 extends past the protrusion 246 and the cutout 254 allows the protrusion 252 to slide over at least part of the protrusion 246. In at least one aspect, the protrusion 252 can move toward the clutch pack 214 to compress and engage the clutch pack 214.

The protrusion 252 further defines an annular channel 256 positioned on the side of the protrusion opposite the cutout 254. The thrust bearing 238 is positioned within the annular channel 256 and the thrust bearing 238 extends outside of the annular channel 256. The clutch hub 228 further defines a channel 258 positioned on the opposite end of the actuator piston 232 from the protrusion 252. The first snap ring 242 is positioned within the channel 258.

The cam disc 230 is positioned along the reference axis 192 and positioned concentrically about the actuator piston 232. The cam disc 230 includes an annular peripheral flange 286 defining a hole. The annular peripheral flange 286 extends along the reference axis 192 and toward the protrusion 252. In at least one aspect, the hole 282 allows at least a portion of the cam disc 230 to slide over the protrusion 252. The cam disc 230 is positioned on the actuator piston between the first snap ring 242 and the protrusion 252. The cam disc 230 defines a hole 284 on the opposite end from hole 282. The first snap ring 242, when positioned in the channel 258, extends radially out of the channel 258. The first snap ring 242 keeps the cam disc 230 from translating off the actuator piston 232 in a direction away from the protrusion 252 along the reference axis 192. As such, the first snap ring 242 acts as a stop to prevent the cam disc 230 from translating off the actuator piston 232. When the cam disc 230 has translated the maximum distance away from the protrusion 252, the first snap ring 242 rests in the channel 258. The first snap ring 242 exits the hole 284 when the cam disc 230 translates toward the protrusion 252.

The actuator spring 234 is positioned within the hole 282 and around the actuator piston 232. The actuator spring 234 is disposed concentrically about the actuator piston 232 and the cam disc 230 is disposed concentrically about the actuator spring 234. The actuator spring 234 is positioned between the bottom of hole 282 and the protrusion 252. The actuator spring 234 applies a biasing force against the bottom of the hole 282 and the protrusion 252 to move the protrusion 252 away from the cam disc 230. In at least one aspect, the actuator spring 234 is one or more bevel springs. The thrust washer 236 is positioned between the actuator spring 234 and the thrust bearing 238. As such, the thrust bearing 238 allows the actuator piston 232 to rotate about the reference axis 192 while the cam disc 230, actuator spring 234, and thrust washer 236 do not have to rotate with the actuator piston 232.

The cam disc 230 does not rotate about the reference axis 192. The end of the annular peripheral flange 286 of the cam disc 230 includes a toothed periphery 288 that extends radially away from the reference axis 192. The toothed periphery 288 fixes the cam disc in rotational position. For example, the toothed periphery 288 can mate with splines in the middle housing 164, where the splines lock the cam disc 230 rotationally and allow the cam disc 230 to translate along the splines and as such along the reference axis 192. Similarly, in at least one aspect, the actuator spring 234 and thrust washer 236 do not rotate about the reference axis 192.

The input mechanism 216 controls the translation of the cam disc 230 along the reference axis 192 to move the cam disc 230 toward or away from the protrusion 252. Movement of the cam disc 230 toward the protrusion 252 compresses the actuator spring 234 causing the actuator spring 234 to bias the actuator piston toward the clutch pack 214. The cam disc 230 is held in translational position by the input mechanism 216. As such, when the actuation spring 234 is compressed, the actuator spring 234 applies a biasing force on the protrusion 252 through the thrust washer 236 and thrust bearing 238 in the direction along the reference axis 192 away from the cam disc 230. The biasing force produced by the actuation spring 234 increases as the cam disc 230 is translated toward the protrusion 252. This biasing force moves the protrusion 252 toward the clutch pack 214. The cam disc 230 does not directly contact the actuator piston 232 to translate the actuator piston 232 and instead causes the actuator piston 232 to translate through the biasing force of the actuation spring 234. Referring to FIG. 6A, the actuation spring 234 of the high-speed assembly 200 is shown as being compressed causing the actuation spring 234 to translate the actuator piston 232 to engage the clutch pack 214. The actuation spring 234 of the low-speed gearing assembly 202 is shown as being uncompressed or less compressed with the clutch pack 214 disengaged.

To move the protrusion 252 toward the clutch pack 214, the biasing force of the actuation spring 234 must be greater than the biasing force of the return spring 240. Once the biasing force of the actuation spring 234 has increased to above a threshold value, the actuation piston 232 will have moved enough to compress the clutch pack 214 between the protrusion 252 and the bottom of the hole 276 of the first gear 206 to cause the clutch pack 214 to engage. As the biasing force of the actuation spring 234 increases the protrusion 252 will begin compressing the clutch pack 214 causing the clutch pack 214 to slip and then fully engage as the first members 260 and second members 262 are contact each other with enough force to rotate together. Upon fully engaging the clutch pack 214, the clutch hub 228 and the first gear 206 will rotate together. Once the biasing force of the actuation spring 234 decreases to be less than the biasing force of the return spring 240, the return spring 240 will bias the protrusion away from the clutch pack 214 disengaging the clutch pack 214. As the biasing force of the actuation spring 234 decreases the first members 260 and second members 262 will contact each other with less force until the clutch pack 214 begins to slip and then fully disengages.

There is a direct relationship between the biasing force of the actuation spring 234 and the translational position of the cam disc 230. As the cam disc 230 moves toward the protrusion 252, the biasing force increases and as the cam disc 230 moves away from the protrusion 252 the biasing force decreases. As such, the actuator spring 234 is sized and configured to position the actuator piston 232 to engage the clutch members 260, 262 at a first translational position of the cam disc 230. The actuator spring 234 is sized and configured such that it does not position the actuator piston 232 to engage the clutch members 260, 262 at a second translational position of the cam disc 230. For example, at the second translational position the clutch pack 214 could be disengaged.

The input mechanism 216 interacts with the cam disc 230 to cause the cam disc to translate, for example, to translate to and from the first translational position and the second translational position. The input mechanism 216 includes an electric machine 172, a pinion gear 220, a cam gear 290, a first thrust washer 292, a second thrust washer 294, and a cam gear holder 296. The electric machine 172 includes an output shaft 222 that is mechanically coupled to a shaft 224 of the pinion gear 220. The shaft 224 extends toward the cam gear 290 and gear teeth 226 of the pinion gear 220 are positioned on the shaft 224 to mesh with gear teeth 298 of the cam gear 290. The cam gear 290 is disposed concentrically about the cam disc 230 and the cam gear 290 rotates about the reference axis 192.

In at least one aspect, the pinion gear 220 is a worm gear and the cam gear 290 is a ring gear formed by an annular body extending about the reference axis 192 and having an inner circumference and an outer circumference. The outer circumference has a plurality of teeth that mesh with the pinion gear 220 and the inner circumference has at least one cam follower 300. In at least one aspect, the outer circumferential surface is formed to mesh with the pinion gear 220. For example, the outer circumferential surface can have an annular concave section 312 (FIG. 9) meshing with the pinion gear 220. The annular concave section 312 can at least partially surround the pinion gear 220. The cam disc 230 includes at least one cam ramp 302 (FIG. 9) formed from a radially raised surface that tapers along the annular peripheral flange 286. The cam follower 300 engages the cam ramp 302. Rotation of the cam gear 290 about the reference axis 192 moves the cam follower 300 along the cam ramp 302 causing the cam disc 230 to translate along the reference axis 192. The pinion gear 220 receives rotational input from the electric machine 172. The electric machine 172 is controlled (e.g., by the control system 120) to rotate the pinion gear 220 to cause the cam disc 230 to translate along the reference axis 192 to engage or disengage the clutch pack 214.

The first thrust washer 292 is positioned along the reference axis 192 against one side of the cam gear 290 and the second thrust washer 294 is positioned along the reference axis 192 against the opposite side of the cam gear 290. The cam gear 290 defines a rounded annular channel 304 positioned on each side of the cam gear 290. The first thrust washer 292 and the second thrust washer 294 both include a rounded annular protrusion 306 extending along the reference axis 192. The rounded annular protrusion 306 is positioned within a rounded annular channel 304 to align the first thrust washer 292 and the second thrust washer 294 with the cam gear 290. The first thrust washer 292 and the second thrust washer 294 hold the cam gear 290 in a fixed translational position and only allow the cam gear 290 to rotate along the reference axis 192.

A cam gear holder 296 maintains the first thrust washer 292 in position. The cam gear holder 296 includes an annular protrusion 308 defining an annular channel 310. The first thrust washer 292 is positioned within the annular channel 310. The cam gear holder 296 can be held in a fixed position by the middle housing 164. For example, the cam gear holder 296 can be positioned within an opening within the middle housing 164 that maintains the cam gear holder 296 in a fixed position. The cam gear holder 296 defines a cutout 297 allowing room for the input mechanism 216. The second thrust washer 294 is held in a fixed position by the middle housing 164. For example, the middle housing 164 can surround the second thrust washer 294 on the longitudinal side away from the cam gear 290 and radially surround the second thrust washer 294 to maintain the second thrust washer 294 is in a fixed position. As such, the cam gear 290 is held translationally in a fixed position while being allowed to only rotate about the reference axis 192.

The cam gear 290 can be related to a clock position of the reference axis 192. The cam gear 290 can be rotated by the pinion gear 220 to change the clock position of the cam gear 290. As such, the pinion gear 220 can drive the cam gear 290 between a range of clock angles about the reference axis 192 corresponding to a range of translational positions of the cam disc 230 along the reference axis 192. For example, rotation of the cam gear 290 causes the cam follower 300 to move along the cam ramp causing the cam disc 230 to translate along the reference axis 192. The cam gear 290 can only rotate the length of the cam ramp 302. The cam disc 230 includes clock limiters 314 on opposite ends of the cam ramp 302 that engage the cam follower 300 to impede rotation of the cam gear 290 about the reference axis 192. For example, the clock limiters 314 can be in the form of radial protrusions from the cam ramp 302. If the cam gear 290 is attempted to be rotated to a clock position outside of the cam ramp 302, then the cam follower 300 will impact the clock limiter 314 at the end of the cam ramp 302 stopping the rotation of the cam gear 290 at the clock position at the end of the camp ramp 302.

Figure 9:
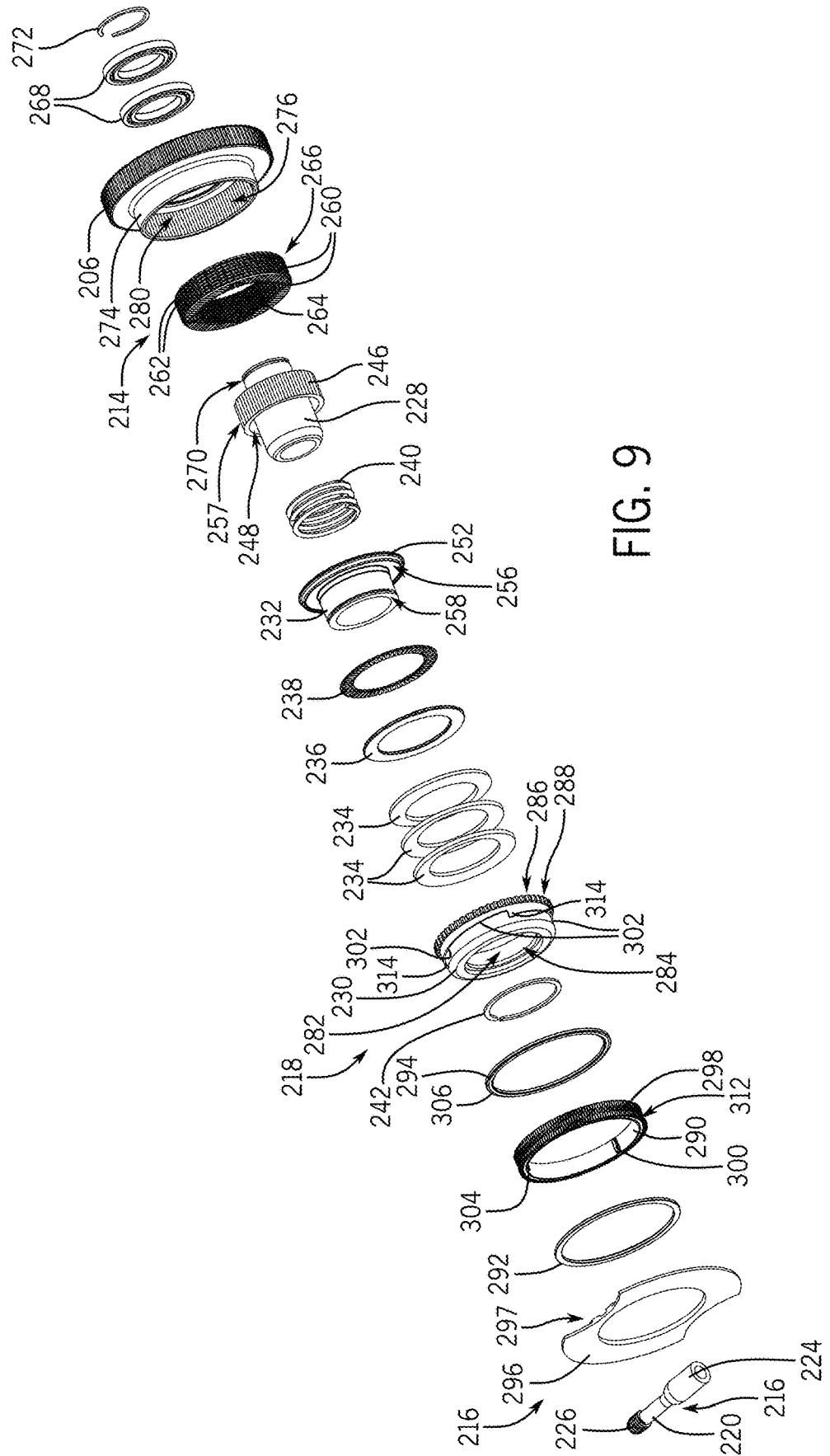
FIG. 9 is an exploded view thereof.
Figure 10:
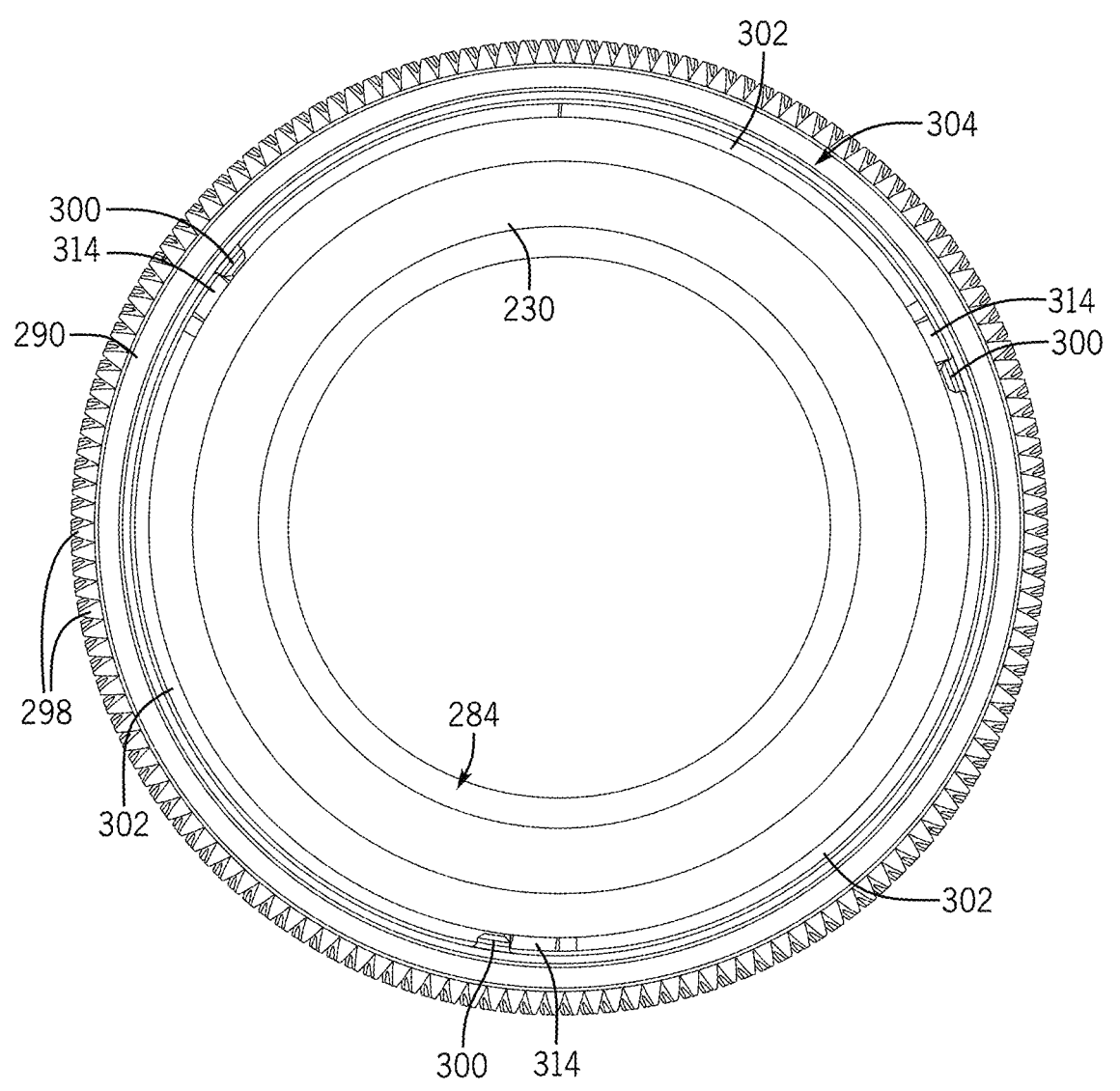
FIG. 10 is a side view of a cam disc coupled to a ring gear of the example electric clutch assembly of FIG. 8.

Referring also to FIGS. 9 and 10, the cam gear 290 includes three cam followers 300 equally spaced around the inner circumference of the cam gear 290. As such, the cam followers 300 are positioned 120 degrees apart. The three cam followers 300 engage 3 cam ramps 302 of the cam disc 230. The cam ramps 302 are positioned equally around the annular peripheral flange 286 with a clock limiter positioned between each cam ramps 302. As such, the cam gear 290 can rotate approximately 120 degrees to move a cam follower 300 the entire length of the correspondingly engaged cam ramp 302. The amount of rotation the cam gear 290 can perform corresponds to the length of the cam ramp 302. In some aspects, the length of the cam ramp 302 can correspond to the number of cam ramps 302 positioned around the cam disc 230. For example, if the cam ramps 302 are positioned equally around the cam disc 230 and take up as much length around the cam disc 230 as possible, then the more cam ramps 302 there are the shorter the cam ramps 302 would be for them to fit in the space around the cam disc 230. As such, the amount of rotation the cam gear 290 can perform before being impeded by a clock limiter 314 would decrease as the number of cam ramps 302 increases.

In an alternative aspect, the cam gear 290 can have any number of cam followers greater than zero. In one aspect, each cam follower 300 would have a corresponding cam ramp 302. In an alternative aspect, more than one cam follower 300 could be engaged with a single cam ramp 302. In this instance, the total amount of rotation that could be performed by the cam gear 290 would be limited by the placement of the cam followers 300 since the rotation is impeded once a cam follower reaches a clock limiter 314.

Referring back to FIGS. 5, 6A, and 8, the electric machine 172 is controlled (e.g., by the control system 120) to rotate the pinion gear 220 causing the cam gear 290 to rotate and change clock positions. The electric machine 172 can rotate the cam gear 290 from a first clock position corresponding to a disengaged position of the clutch pack 214 to a second clock position corresponding to an engaged position of the clutch pack 214. The cam gear 290 rotates moving the cam followers 300 along the cam ramps 302 causing the cam disc 230 to translate toward the protrusion 252 of the actuator piston 232 causing the actuator spring 234 to be compressed. The actuator spring 234 generates a biasing force pressing the cam disc 230 away from the protrusion 252. As such, the biasing force presses the cam ramps 302 against the cam followers 300 and keeps the cam followers 300 engaged with the cam ramps 302. The cam disc 230 cannot move away from the protrusion 252 since the middle housing 164 keeps the cam gear holder 296, first thrust washer 292, and cam gear 290 in translational position against the biasing force. As such, as the cam followers 300 move along the cam ramps 302 toward the second clock position the cam disc 230 translates toward the protrusion 252 increasing the compressive biasing force of the actuator spring 234. The return spring 240 generates a biasing force pressing the actuator piston 232 away from the first gear 206 and toward the cam disc 230. The actuator spring 234 and return spring 240 are sized and configured to provide an actuator spring biasing force that overcomes the return spring biasing force once the cam disc 230 has translated toward the protrusion 252 past a threshold translation value. Once the spring biasing force is overcome by the actuator spring biasing force, the actuator spring 234 moves the actuator piston 232 and protrusion 252 toward the clutch pack 214. It is noted that as the actuator piston 232 moves toward the clutch pack 214, the spring biasing force increases. The actuator spring 234 and return spring 240 are sized and configured to have the actuator spring force overcome the spring biasing force to move the protrusion 252 to compress and engage the clutch pack 214 against the first gear 206.

The speed the clutch pack 214 needs to become engaged and disengaged can be based on the type of work vehicle 100 and the operations desired to be performed by the work vehicle 100. The speed of the compression of the clutch pack 214 is a function of the translational movement of the actuator piston 232. The translational movement of the actuator piston 232 is based on the amount of biasing force produced by the actuator spring 234. The speed at which the clutch pack 214 is engaged can be changed by changing the speed the electric machine 172 rotates the pinion gear 220, changing the slope of the cam ramp 302, and/or change the actuator spring 234 to have a different spring constant which affects the biasing force produced over a distance. The speed of the pinion gear 20 rotates changes how fast the cam gear 290 rotates, which affects the speed of the translational movement of the can disc 230. The slope of the cam ramp 302 changes how fast the cam disc 230 translates based on a rotation of the cam gear 290. Changing the actuator spring 234 to have a higher spring constant can cause the actuator piston 232 to translate more with less translational movement of the cam disc 230.

In at least one aspect, the drive shaft 186 is rotating based on a rotational input from the electric machine 152. The rotation of the drive shaft 186 causes the clutch hub 228 to rotate with the drive shaft 186. The actuator piston 232, return spring 240, and first members 260 rotate with the clutch hub 228. In at least one aspect, the thrust bearing 238 allows the cam disc 230 to not rotate with the clutch hub 228 and remain rotationally fixed. When the clutch pack 214 is disengaged, the first members 260 and second members 262 can rotate at different speeds. For example, the clutch pack 214 of the clutch assembly 212 could be in the engaged position causing the first gear 206 and second members 262 to rotate based on the rotation of the drive shaft 182 due to the low-speed gearing being engaged. In an alternative example, the clutch assembly 212 could also be in the disengaged position with the drive shaft 182 not rotating due to the work vehicle being stationary. With the drive shaft 182 not moving, then the first gear 206 and second members 262 would also be stationary.

As the actuator spring force causes the protrusion 252 to compress the clutch pack 214 between the protrusion 252 and the bottom of the hole 276 of the first gear 206. As the compression of the clutch pack 214 increases the first members 260 and second members 262 will begin to build a friction force between them. As discussed previously, the friction force increases to having the first members 260 and second members 262 touch and slip past each other to having the first members 260 and second members 262 fully engaged and rotating together. In both instances, torque is transferred from the drive shaft 186 and clutch hub 228 to the first gear 206 through the clutch pack 214. If the clutch pack 214 is slipping, then not all the torque being supplied by the drive shaft 186 is being supplied to the first gear 206 through the clutch pack 214. If the clutch pack 214 is fully engaged, then all the torque being supplied by the drive shaft 186 is being supplied to the first gear 206 through the clutch pack 214. At the second clock position, the clutch pack 214 can be fully engaged.

Rotating the cam gear 290 from the second clock position to the first clock position, moves the clutch pack 214 from being fully engaged to being disengaged. As the cam gear 290 rotates, the cam disc 230 translates away from the protrusion 252 decreasing the actuator spring biasing force. As the actuator spring biasing force decreases the biasing force of the return spring 240 moves the actuator piston 232 and protrusion 252 away from the clutch pack 214. As such, the compressive force on the clutch pack 214 decreases allowing the clutch pack 214 to go from fully engaged to slipping and then to being disengaged.

It is important that the clutch pack 214 can slip to allow for a smooth transition of torque from one gearing system to another during power shifting. Power shifting is to shift from the high-speed gearing assembly 200 or the low-speed gearing assembly 202 to the other while moving. During the shifting process, the clutch packs 214 slip as one clutch pack 214 begins engaging and the other clutch pack 214 begins disengaging. During this slipping period, the high-speed gearing assembly 200 and the low-speed gearing assembly 202 both supply torque from the drive shaft 186 to the drive shaft 182. The amount of torque supplied by each gearing assembly 200, 202 changes as the gearing assemblies 200, 202 become more engaged or disengaged. As a gearing assembly 200, 202 becomes more engaged the amount of torque supplied by that gearing assembly 200, 202 increases until it reaches the fully engaged position. As a gearing assembly 200, 202 becomes more disengaged the amount of torque supplied by that gearing assembly 200, 202 decreases until it reaches the fully disengaged position. The clutch assemblies 196, 212 move to the fully disengaged position and fully engaged position to transition from one gearing assembly 200, 202 to the other.

The drive shaft 182 drives the differential assembly 204 to drive the wheel hubs 170 and the ground engaging members 104. The hubs 170 are elongated members extending through the outer casings 316 of the wheel end units 168 and rotationally supported by one or more bearings 318 at each laterally inner and outer end so as to rotate about a wheel axis 320, about which the ground-engaging members 104 rotate during travel of the work vehicle 100. In an alternative aspect, a longer or shorter wheel hub 170 is possible by shortening or extending the length of the wheel hub 170 and outer casing 316. The laterally inner ends of the elongated hubs 170 couple to final reduction gear sets 322. Each final reduction gear set 322 may be embodied as a planetary gear set. However, other types of reduction drives may also be used. In the depicted embodiment, the laterally inner end of each elongated hub 170 is splined or toothed to engage with the splines or teeth of a planet carrier C2. The carrier C2 has pinions that rotatably mount planetary gears P2 (e.g., two, three or more), which are positioned in the annular space between a ring gear R2, which is formed in or fixed relative to the casing of the wheel end unit 168, and a sun gear S2 to mesh with both the ring gear R2 and the sun gear S2. The sun gear S2 is rigidly coupled to a shaft 324 to co-rotate as one unit about the wheel axis 320. Recesses in the laterally outer ends of the shafts 324 accommodate the heads of bolts 326 threaded into the inner ends of the elongated hubs 170 to secure retainer plates 328 in abutment with the carriers C2, and thereby retain the elongated hubs 170 to the carriers C2 for co-rotation therewith. The illustrated final reduction gear sets 322 provides sun-in, carrier-out-type power flow planetary arrangements that effect a deep gear reduction ratio between the power input to the wheel end units 168 and the power output from the wheel end units 168 to the ground-engaging members 104.

Referring also to FIG. 5, the laterally inner end of shaft 324 of each final reduction gear set 322 extends into a differential assembly 204 that rotates about the wheel axis 320, relative to the wheel end casings 316 and the differential housing 166. In the illustrated example, the differential assembly 204 includes a differential casing 330 that rotates on bearings 332 relative to mounting collars 336 coupled to the wheel end casings 316. The differential casing 330 defines an interior cavity in which are disposed differential pinions 334 and pinion gears 338. In the illustrated example there are four differential pinions 334 mounting four pinion gears 338. The differential pinions 334 intersect at right angles and are arranged orthogonal to the wheel axis 320, with their ends fit into recesses in the interior of the differential casing 330. The differential pinion gears 338 engage two side gears 340, 342 positioned on opposite sides of the differential assembly 204 and rigidly fixed (e.g., press-fit or keyed) to the laterally inner ends of the shafts 324. The differential pinion gears 338 and the side gears 340, 342 are embodied as bevel gears such that axes of rotation thereof are perpendicular. As will be understood, the differential assembly 204 enables rotation of the side gears 340, 342 at different speeds, and thereby, to allow the elongated hubs 170 of the wheel end units 168 to drive the ground-engaging members 104 at different rotational speeds.

In the depicted embodiment, the differential assembly 204 can be locked by a brake 344. The brake 344 may be activated electro-hydraulically, through the operator interface 124 via the control system 120, by moving a piston 346 into engagement with the brake 344. The brake 344 has a pack 348 of alternately interleaved plates and friction discs that are alternately splined to the differential casing 330 and an annular hub 350 of the side gear 340. Engaging the brake 344 causes the side gear 340 to co-rotate with the differential casing 330, and in so doing, causes the differential pinions and pinion gears 338 to co-rotate the side gear 342 with the side gear 340 and the differential casing 330. This effectively "locks" the differential assembly 204 such that both of the shafts 324 and the elongated hubs 170 also co-rotate together. This, in turn, locks the left and right ground-engaging members 104 to co-rotate together at the same speed, in the manner of a fixed axle.

Figure 11:
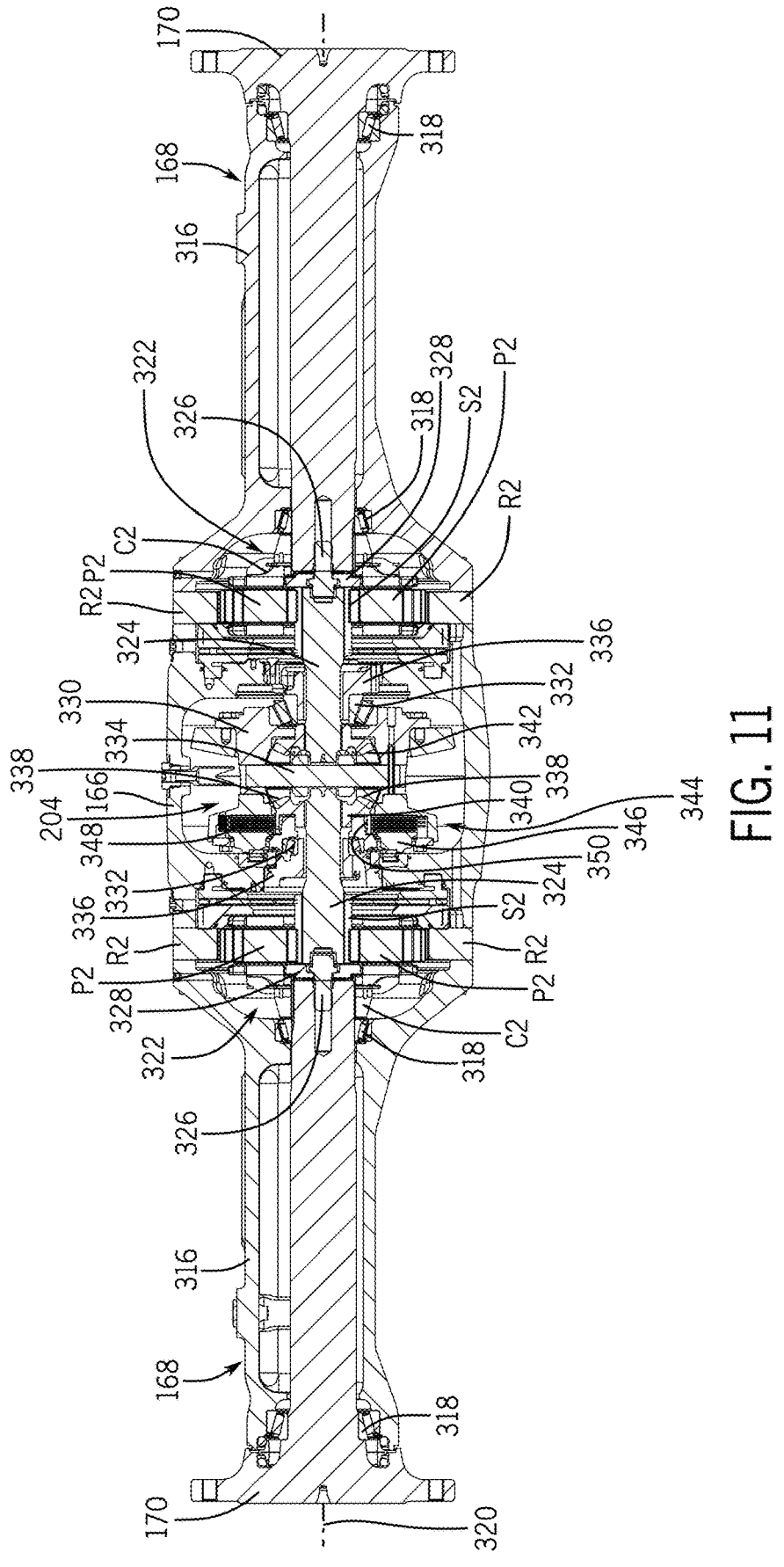
FIG. 11 is a cross-sectional view taken along line 11-11 of FIG. 4.

As shown in FIGS. 5 and 11, power from the drive shaft 182 is coupled to the differential assembly 204, and thereby the wheel end units 168, through a drive gear 352. The drive gear 352 is rigidly coupled to the differential casing 330 to co-rotate therewith about the wheel axis 320. The drive gear 352 is configured with an annular beveled face 354 defining teeth of any suitable configuration, and which, in the depicted example, are spherical bevel teeth. The drive shaft 182 extends through a bearing 357 and into the differential assembly 204. The drive shaft 182 includes a gear output 356 meshing with the teeth of the annular beveled face 354 of the drive gear 352. The rotation of the drive shaft 182 causes the drive gear 352 to rotate which in turn rotates the wheel end units 168 and the rear ground engaging members 104 attached to the wheel end units 168.

The electric transaxle further includes one or more power take off assemblies that are driven by the drive shaft 182. Each power take off assembly is mounted to or contained at least in part with in the one or more housings (e.g., the motor and inverter housing 160, the forward housing 162, and the middle housing 164). The power take off assemblies are each configured to receive power from the drive shaft 182. The power take off assemblies can be mechanically coupled to drive the front ground engaging members 104. For example, one of the power take off assemblies can be used to drive the front ground engaging members 104 through a front differential assembly that functions similar to the differential assembly 204. In the depicted embodiment, there are two power take off assemblies. The first power take off assembly is a continuous four wheel drive assembly 156 and the second power take off assembly is a mechanical momentary four wheel drive assembly 158.

The work vehicle 100 can be only rear drive, selectively four-wheel drive, or always four-wheel drive. The type of four-wheel drive can be selected based on the type of work vehicle 100 or can be chosen upon manufacturing. For example, the power take off assembly being used or not used can provide the type of four wheel drive desired.

Figure 6B:
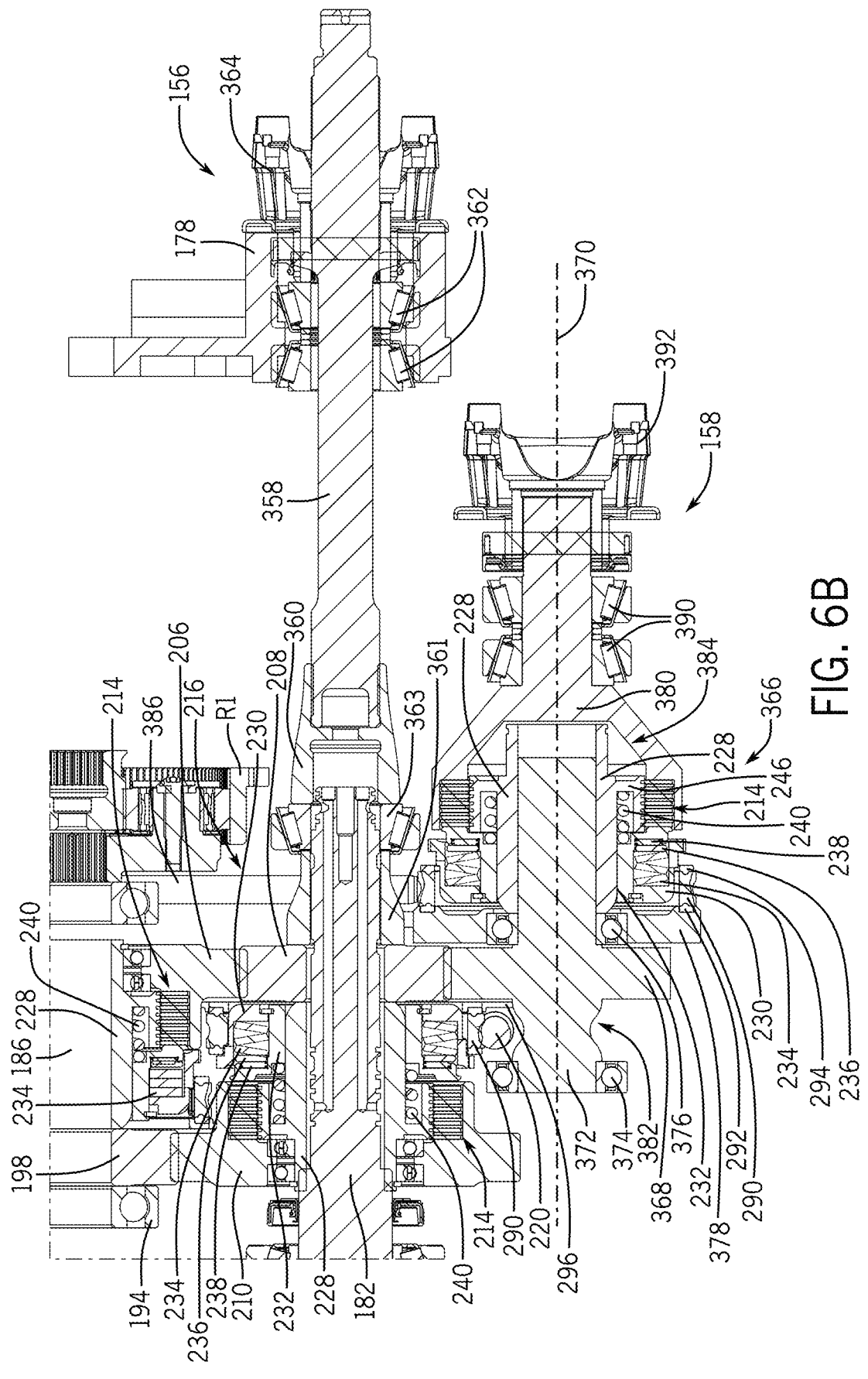
FIG. 6B is an enlarged detail view showing area 6B-6B of FIG. 5.
Figure 7:
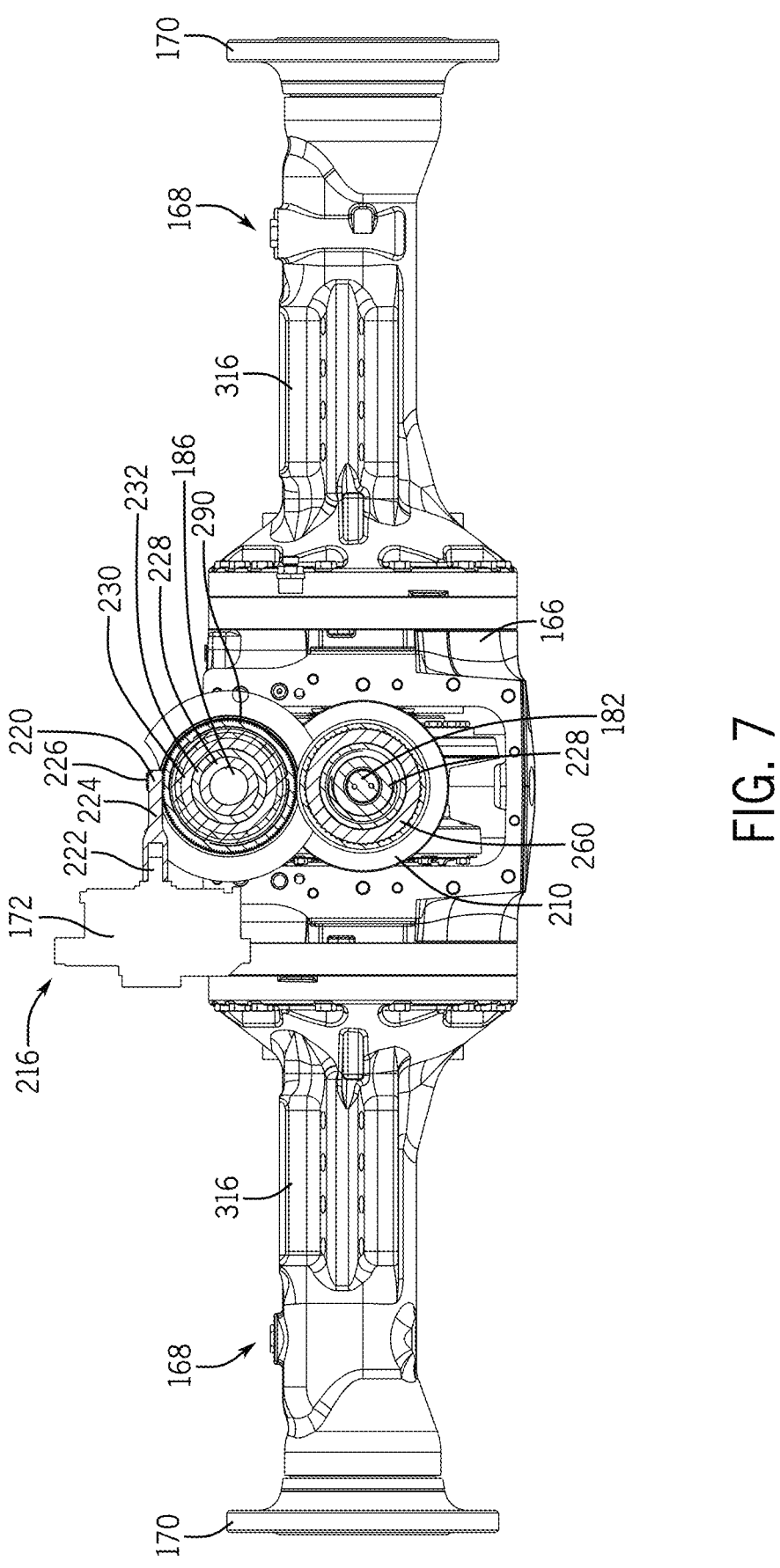
FIG. 7 is a cross-sectional view taken along line 7-7 of FIG. 4.
Figure 8:
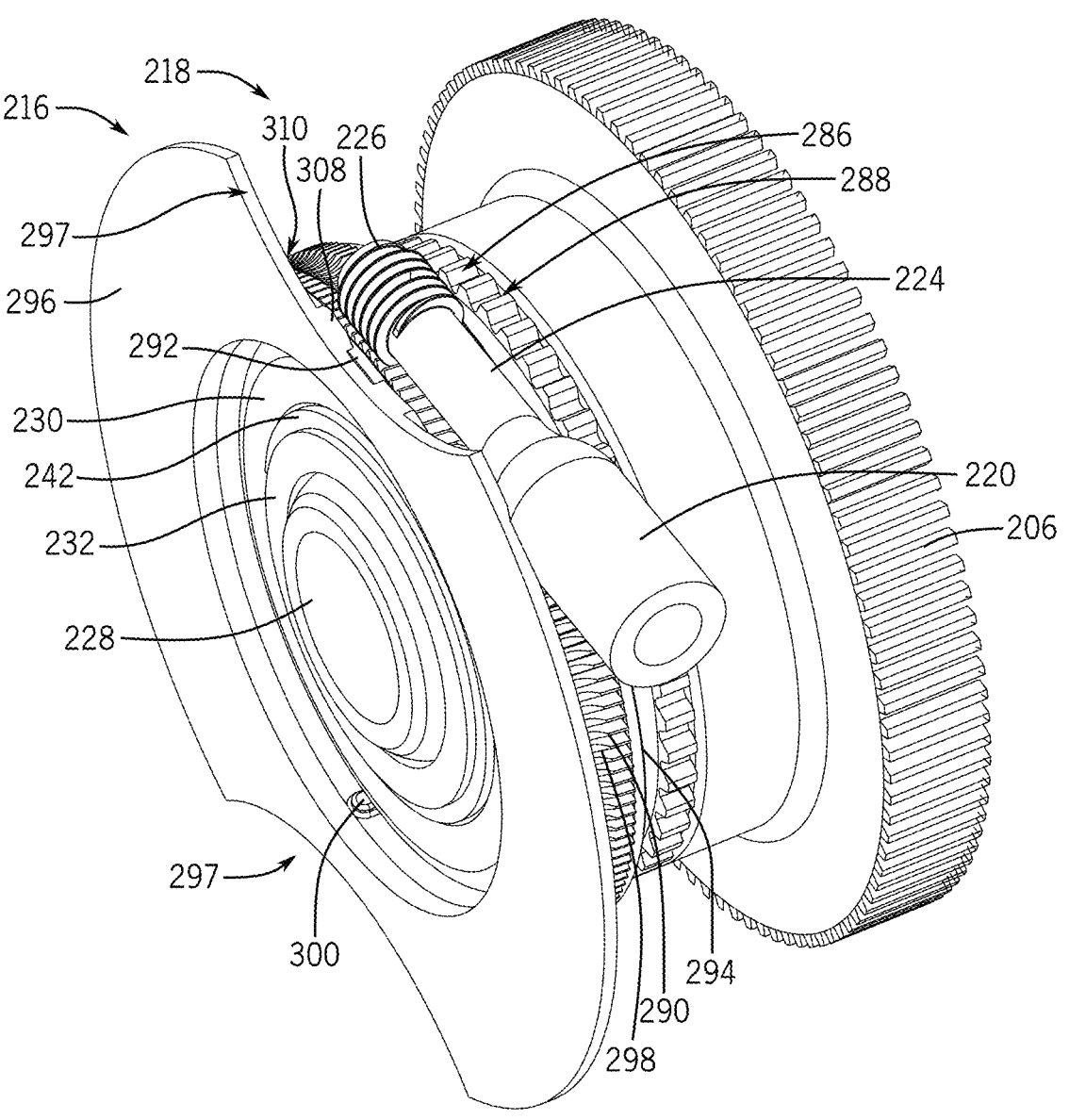
FIG. 8 is a perspective view of an example electric clutch assembly of the drive assembly of FIG. 3.

Referring also to FIGS. 5 and 6B, the always four-wheel drive has the rear ground engaging members 104 and front ground engaging members 104 be driven by the drive shaft 182. This process uses the continuous four-wheel drive assembly 156. In this assembly 156, the drive shaft 182 is coupled to a front drive shaft 358 through a coupler 360. For example, the drive shaft 182 can include splines that mate with spines of the coupler 360 and the front drive shaft 358 can include splines that mate with splines of the coupler 360. The drive shaft 182 extends through a spacer 361 and a bearing 363 to reach the coupler 360. Rotation of the drive shaft 182 rotates the front drive shaft 358. The front drive shaft 358 extends through the motor and inverter housing 160 and through the end plate 178 along the rotation axis 174. The front drive shaft 358 extends through two bearings 362 housed within the end plate 178 and out through the end plate 178. The bearings 362 allow the front drive shaft 358 to rotate relative to the end plate 178. The end of the front drive shaft 358 is coupled to an output coupler 364. The output coupler 364 can be coupled the front drive shaft 358 to another drive shaft to drive the front ground engaging members 104. For example, the front drive shaft 358 can drive the front ground engaging members through a front differential assembly that functions similar to the differential assembly 204.

Referring also to FIGS. 5, 6A, and 6B, the selectively four wheel drive has the rear ground engaging members 104 and front ground engaging members 104 be driven by the drive shaft 182 when four wheel drive is engaged and be only rear wheel drive when the four wheel drive is disengaged. This process uses the mechanical momentary four-wheel drive assembly 158. This assembly 158 includes a clutch assembly 366 to engaged and disengage the four-wheel drive. The clutch assembly 366 functions the same as clutch assembly 196 and clutch assembly 212. For the sake a brevity, not all similarities will be discussed in detail. A gear 368 is meshed with the second gear 208. The second gear 208 is meshed with the drive shaft 182 and rotates with the drive shaft 182. The rotation of the second gear 208 rotates the gear 368. In at least one aspect, the gear 368 is sized to have the shaft 372 rotate at the same speed as the drive shaft 182.

The gear 368 defines a rotation axis 370. The gear 368 includes a shaft 372 extending away from the gear 368 along the rotation axis 370 in both directions. The shaft 372 extends through bearing 374 and bearing 376. The shaft 372 defines a cutout 382 allowing room for the input mechanism 216 of the clutch assembly 212. The bearings 374, 376 allow the gear 368 to rotate relative to the housings 160, 162, 164. The bearing 374 is housed in the middle housing 164 and the bearing 376 is housed within the cam gear holder 378 of the clutch assembly 366. The cam gear holder 378 is attached to the front housing 162. The cam gear holder 378 functions the same as cam gear holder 296. The cam gear holder 378 holds the first thrust washer 292 in position and the second thrust washer 294 is held in position by the forward housing 162. The first thrust washer 292 and the second thrust washer 294 hold the cam gear 290 in position while allowing the cam gear 290 to rotate about only the rotation axis 370.

The gear 368 is coupled to a front drive shaft 380 through the clutch assembly 366. As such, when the clutch assembly 366 is engaged, the gear 368 and front drive shaft 380 rotate together, and when the clutch assembly 366 is disengaged, the gear 368 and front drive shaft 380 are not coupled and do not rotate together. The front drive shaft 380 expands radially away from the rotation axis 370 toward the gear 368. The front drive shaft 380 defines a hole 384 toward the gear 368 and at least a portion of the shaft 372 is positioned within the hole 384. The shaft 372 is coupled to the clutch hub 228 to have the clutch hub 228 rotate with the shaft 372. For example, splines on the shaft 372 can mate with splines on the clutch hub 228. The protrusion 246 is positioned within the hole 384. The clutch pack 214 is positioned between the clutch hub 228 and the front drive shaft 380. The first members 260 are mated with the clutch hub 228 and the second members 262 are mated with the inner surface of the hole 384 of the front drive shaft 380. As discussed previously, when the clutch pack 214 is engaged, the first members 260 are compressed against the second members 262 until the first members 260 and the second members 262 rotate together making the clutch hub 228 and the front drive shaft 380 rotate together.

Similar to clutch assemblies 196, 212, the clutch assembly 366 is engaged and disengaged by the input mechanism 216 of the clutch assembly 366. The electric machine 176 includes an output shaft that is mechanically coupled to a shaft 386 of a pinion gear 388. The pinion gear 388 functions the same as pinion gear 220. The electric machine 176 is attached to the forward housing 162 and the shaft 386 extends through the forward housing 162 to reach the cam gear 290 of the clutch assembly 366. The pinion gear 388 receives rotational input from the electric machine 176. The electric machine 176 is controlled (e.g., by the control system 120) to rotate the pinion gear 388 to cause the cam gear 290 to rotate which in turn causes the cam disc 230 to translate along the rotation axis 370 to engage or disengage the clutch pack 214. The toothed periphery 288 of the cam disc 230 is engaged with the forward housing 162 to keep the cam disc 230 from rotating and allow the cam disc 230 to only translate along the rotation axis 370. The cam disc 230 translates along the rotation axis 370 causing the actuator piston 232 to translate along the rotation axis 370 due to the biasing force from the actuation spring 234. The translation of the actuator piston 232 toward the front drive shaft 380 can compress the clutch pack 214 eventually fully engaging the clutch pack 214 and translation of the actuator piston 232 away from the front drive shaft 380 can disengage the clutch pack 214.

The front drive shaft 380 extends through the motor and inverter housing 160 along the rotation axis 370 and out of the motor and inverter housing 160. The front drive shaft 380 extends through two bearings 390 housed within the motor and inverter housing 160. The bearings 390 allow the front drive shaft 380 to rotate relative to the motor and inverter housing 160. The end of the front drive shaft 380 is coupled to an output coupler 392. The output coupler 392 can couple the front drive shaft 380 to another drive shaft to drive the front ground engaging members 104, when the four-wheel drive is engaged by the electric clutch assembly 366. For example, when the four-wheel drive is engaged by the electric clutch assembly 366, the front drive shaft 380 can drive the front ground engaging members 104 through a front differential assembly that functions similar to the differential assembly 204. An operator can engage the four-wheel drive through the operator interface 124 and have the control system 120 control the electric machine 176 to engage the electric clutch assembly 366. Similarly, the operator can disengage the four-wheel drive through the operator interface to have the work vehicle be rear wheel driven.

Another type of four-wheel drive is for the work vehicle to be only rear wheel driven by not using the continuous four-wheel drive assembly 156 or the mechanical momentary four-wheel drive assembly 158. For example, neither output coupler 364 nor the output coupler 392 would be connected to drive the front ground engaging members 104. In this case, the front drive shaft 358 and the front drive shaft 380 can be removed with the openings in the housing 160 and end plate 178 for the drive shafts 358, 380 being capped to close the openings. In the case of always four-wheel drive, the front drive shaft 380 can be removed with the opening in the housing 160 for the drive shaft 380 being capped to close the opening. In the case of selectively four-wheel drive, the front drive shaft 358 can be removed with the opening in the end plate 178 for the drive shaft 358 being caped to close the opening. In an alternative aspect, the front drive shaft 358 and the front drive shaft 380 can remain for each type of four wheel drive (i.e., rear drive only, always four wheel drive, and selectively four wheel drive) with the output coupler 364, 392 being used for the type chosen for the work vehicle. If rear drive only, then neither output coupler 364, 392 would be used.

As used herein, "e.g." is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

While the above describes example embodiments of the present disclosure, these descriptions should not be viewed in a limiting sense. Rather, other variations and modifications may be made without departing from the scope and spirit of the present disclosure as defined in the appended claims.

Although the present disclosure has been described with reference to example implementations, workers skilled in the art will recognize that changes may be made in form and detail without departing from the spirit and scope of the claimed subject matter. For example, although different example implementations may have been described as including features providing one or more benefits, it is contemplated that the described features may be interchanged with one another or alternatively be combined with one another in the described example implementations or in other alternative implementations. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure. Although portions of the disclosure may use the phrase "at least one" or "one or more" of a particular component or element, unless otherwise specifically limited, the mere recitation of a single element or component does not preclude a plurality of such elements or components.

What is claimed is:

1. An electric clutch comprising:
a clutch pack having clutch members transmitting torque when engaged;
an input mechanism including:
a pinion gear configured to receive rotational input from an electric machine; and
a cam gear meshing with the pinion gear to rotate about a reference axis, the cam gear having a cam follower; and
an actuator assembly including:
an actuator spring;
a cam disc disposed about the reference axis and engaging the cam gear at a cam ramp such that changing a clock position of the cam gear about the reference axis imparts translation of the cam disc along the reference axis to move the actuator spring, wherein the cam disc defines the cam ramp which is engaged by the cam follower to effect translation of the cam disc along the reference axis; and an actuator piston moved by the actuator spring in response to the translation of the cam disc to engage the clutch members of the clutch pack.

2. The electric clutch of claim 1, wherein the pinion gear drives the cam gear between a range of clock angles about the reference axis corresponding to a range of translational positions of the cam disc along the reference axis.

3. The electric clutch of claim 2, wherein a first translational position of the cam disc, the actuator spring is sized and configured to position the actuator piston to engage the clutch members, and in a second translational position of the cam disc, the actuator spring is sized and configured such that it does not position the actuator piston to engage the clutch members.

4. The electric clutch of claim 2, wherein the actuator spring is configured to bias the actuator piston toward the clutch pack.

5. The electric clutch of claim 1, wherein the cam disc has an annular peripheral flange extending about the reference axis and having a toothed periphery that fixes a clock position of the cam disc; and wherein the cam ramp is a radially raised surface that tapers along the annular peripheral flange of the cam disc.

6. The electric clutch of claim 5, wherein the cam gear is a ring gear formed by an annular body extending about the reference axis and having an inner circumference and an outer circumference, and the outer circumference having a plurality of teeth that mesh with the pinion gear and the inner circumference having the cam follower.

7. The electric clutch of claim 1, wherein the cam disc defines clock limiters on opposite ends of the cam ramp that engage the cam follower to impede rotation about the reference axis.

8. The electric clutch of claim 1, wherein the pinion gear is a worm gear and the cam gear is a ring gear having a toothed outer circumference that is meshed with the worm gear to change the clock position of the ring gear about the reference axis.

9. The electric clutch of claim 1, wherein the actuator spring is disposed concentrically about the actuator piston, the cam disc is disposed concentrically about the actuator spring, and the cam gear is disposed concentrically about the cam disc.

10. The electric clutch of claim 1, wherein the actuator assembly further includes a return spring sized and configured to provide a return spring force that biases the actuator piston away from the clutch pack; and wherein the actuator spring is sized and configured to provide an actuating spring force that overcomes the return spring force in at least one translational position of the cam disc to translate the actuator piston toward the clutch pack.

11. The electric clutch of claim 1, wherein the input mechanism includes the electric machine driving the pinion gear.

12. A transmission for a work vehicle, the transmission comprising:

an output shaft;

a gear providing a gear ratio;

an electric clutch coupling the gear to the output shaft when engaged, the electric clutch comprising:

a clutch pack having clutch members transmitting torque when engaged;

an input mechanism including:

a pinion gear configured to receive rotational input from an electric machine; and a cam gear meshing with the pinion gear to rotate about a reference axis, the cam gear having a cam follower; and an actuator assembly including:

an actuator spring;

a cam disc disposed about the reference axis and engaging the cam gear at a cam ramp such that changing a clock position of the cam gear about the reference axis imparts translation of the cam disc along the reference axis to move the actuator spring, wherein the cam disc defines the cam ramp which is engaged by the cam follower to effect translation of the cam disc along the reference axis; and an actuator piston moved by the actuator spring in response to the translation of the cam disc to engage the clutch members of the clutch pack.

13. The transmission of claim 12, wherein the input mechanism includes the electric machine driving the pinion gear.

14. The transmission of claim 12, wherein the pinion gear drives the cam gear between a range of clock angles about the reference axis corresponding to a range of translational positions of the cam disc along the reference axis.

15. The transmission of claim 12, wherein a first translational position of the cam disc, the actuator spring is sized and configured to position the actuator piston to engage the clutch members, and in a second translational position of the cam disc, the actuator spring is sized and configured such that it does not position the actuator piston to engage the clutch members.

16. The transmission of claim 12, wherein the cam gear is a ring gear formed by an annular body extending about the reference axis and having an inner circumference and an outer circumference, and the outer circumference having a plurality of teeth that mesh with the pinion gear and the inner circumference having the cam follower; and wherein the cam disc has an annular peripheral flange extending about the reference axis and having a toothed periphery that fixes a clock position of the cam disc, the cam ramp is a radially raised surface that tapers along the annular peripheral flange of the cam disc, and the cam disc defines clock limiters on opposite ends of the cam ramp that engage the cam follower to impede rotation about the reference axis.

17. The transmission of claim 12, wherein the actuator spring is disposed concentrically about the actuator piston, the cam disc is disposed concentrically about the actuator spring, and the cam gear is disposed concentrically about the cam disc.

18. The transmission of claim 12, wherein the actuator assembly further includes a return spring sized and configured to provide a return spring force that biases the actuator piston away from the clutch pack; and wherein the actuator spring is sized and configured to provide an actuating spring force that overcomes the return spring force in at least one translational position of the cam disc to translate the actuator piston toward the clutch pack.

* * * * *